United States Patent [19]

Gebelein

[11] Patent Number: 5,734,500
[45] Date of Patent: Mar. 31, 1998

[54] BINOCULAR WITH EXTENDED MONOCULAR FIELD

[75] Inventor: Rolin J. Gebelein, Santa Cruz, Calif.

[73] Assignee: Blue Sky Research, Inc., Santa Cruz, Calif.

[21] Appl. No.: 179,504

[22] Filed: Jan. 10, 1994

Related U.S. Application Data

[63] Continuation-in-part of Ser. No. 771,522, Oct. 4, 1991, Pat. No. 5,278,695, which is a continuation-in-part of Ser. No. 615,478, Nov. 19, 1990, abandoned.

[51] Int. Cl.[6] .................. G02B 17/00; G02B 23/00
[52] U.S. Cl. .............. 359/419; 359/407; 359/736
[58] Field of Search .................... 359/404–407, 359/409, 411–415, 419, 811, 815, 819, 480–482

[56] References Cited

U.S. PATENT DOCUMENTS

| | | | |
|---|---|---|---|
| 1,851,579 | 3/1932 | Hixon | 359/411 |
| 2,389,428 | 11/1945 | Glasser | 359/481 |
| 3,273,456 | 9/1966 | Feinbloom | 359/481 |
| 4,325,602 | 4/1982 | Lange | 359/408 |
| 4,540,238 | 9/1985 | Edwards | 359/481 |
| 4,886,340 | 12/1989 | Kanda | 359/411 |
| 4,986,644 | 1/1991 | Yang | 359/411 |
| 5,278,695 | 1/1994 | Gebelein et al. | 359/419 |

FOREIGN PATENT DOCUMENTS 339986  12/1930  United Kingdom .................. 359/481

*Primary Examiner*—Thong Nguyen
*Attorney, Agent, or Firm*—Joseph Smith

[57] ABSTRACT

A wide field monocular is provided which is essentially a wide field virtual telescope. Two of these monoculars can be placed side-by-side to achieve a binocular with an extended monocular field. Also for such binoculars with objective lenses larger than the interocular separation, lunes can be cut from the objective lenses so that they can be placed adjacent each other, with the eyes essentially aligned with the optic axis of each telescope. This provides a remarkable wide field binocular with stereo vision and depth perception.

19 Claims, 25 Drawing Sheets

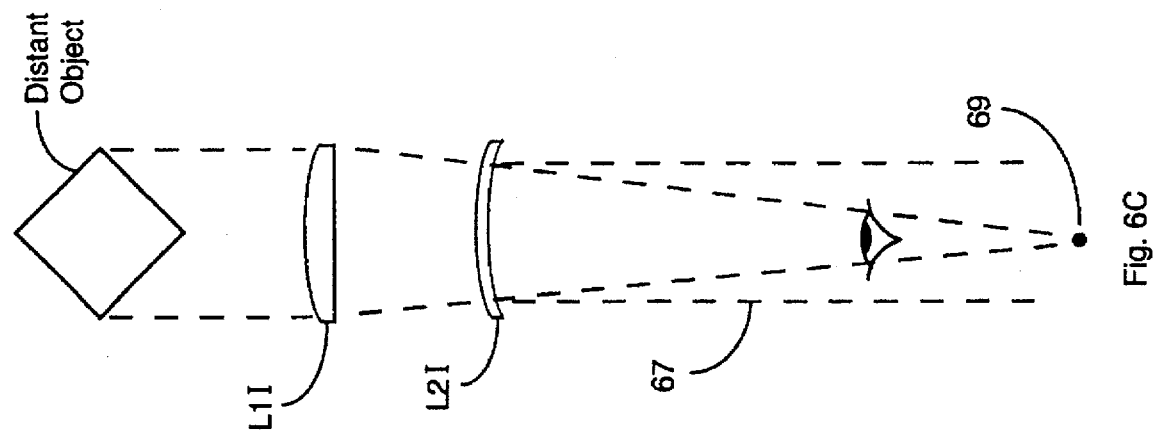
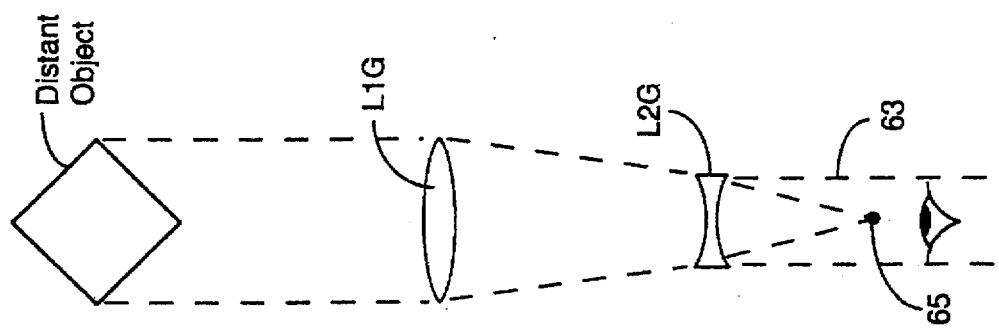
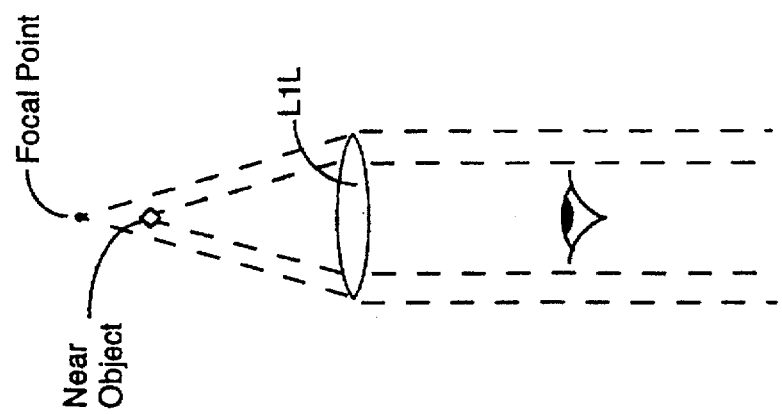

BINOCULAR WITH EXTENDED MONOCULAR FIELD

This application is a continuation-in-part of patent application Ser. No. 07/771,522, filed Oct. 4, 1991, now issued as U.S. Pat. No. 5,278,695; which is a continuation-in-part of application Ser. No. 07/615,478, filed Nov. 19, 1990, now abandoned.

FIELD OF THE INVENTION

This invention relates to an optical magnifier for which the image always remains in focus regardless of the real object distance from the objective lens of the magnifier. Of particular importance are embodiments in which the field of view of this new apparatus is extended, thus enabling one to construct a binocular with truly stereo vision and hence remarkable imagery.

BACKGROUND OF THE INVENTION

In the art, magnification of distant objects is usually accomplished with telescopes, for example with a classical telescope such as that shown in FIG. 1. The objective lens forms a real, reduced image I of the object O. I' is the virtual image of I formed by the ocular. The image I' may be formed anywhere between the near and far points of the eye.

In practice, the objects examined by a telescope are at such large distances from the instrument that the image I is formed very nearly at the second focal point of the objective. Furthermore, if the image I' is at infinity, the image I is at the first focal point of the ocular. The distance between objective and ocular, or the optical length of the telescope, is therefore the sum of the focal lengths of objective and ocular, $f_1+f_2$.

The angular magnification of a telescope is defined as the ratio of the angle subtended at the eye by the final image I', to the angle subtended at the (unaided) eye by the object. As will be shown, this ratio may be expressed in terms of the focal lengths of objective and ocular. The shaded bundle of rays in FIG. 2 corresponds to that in FIG. 1, except that the object and the final image are both at infinity. The ray passing through $F_1$, the first focal point of the objective, and through $F_2'$, the second focal point of the ocular, has been emphasized. The object (not shown) subtends an angle $\theta$ at the objective and would subtend essentially the same angle at the unaided eye. Also, since the observer's eye is placed just to the right of the focal point $F_2'$, the angle subtended at the eye by the final image is very nearly equal to the angle $\theta'$. The distances ab and cd are equal to one another and to the height y' of the image I. Since both $\theta$ and $\theta'$ are small, they may be approximated by their tangents. It can be seen from the right triangles $F_1$ab and $F_2'$cd that $\theta=-y'/f_1$ and $\theta'=y'/f_2$. Hence, the magnification M is given by $M=\theta'/\theta=-(y'/f_2)/(y'/f_1)=-f_1/f_2$. The angular magnification of a classical telescope is therefore equal to the ratio of the focal length of the objective to that of the ocular. The minus sign denotes an inverted image.

Although classical telescopes may be used with such a left for right inverted image without significant disadvantage for astronomical observations, it is desirable that a terrestrial telescope form an erect image. This may be accomplished by the insertion of an erecting lens or lens systems between the objective and ocular. The erecting lens simply serves to invert the image formed by the objective. That is the optical system of the spyglass. It has the disadvantage of requiring an unduly long tube, since four times the focal length of the erecting lens must be added to the sum of focal lengths of objective and ocular. Furthermore, classical telescopes typically have poor eye relief, e.g. about only an inch or two and the eye must be accurately centered on the telescope optical axis for viewing.

The problems of excess length and image inversion have been remedied with the introduction of the Galilean telescope, another form of the classical telescope which obeys the same magnification rule derived above. In the Galilean telescope, the ocular is a double concave lens as illustrated in FIG. 3, and the objective is a double convex lens as for the classical telescope described above. In the Galilean telescope, the objective is configured to focus an image at a point behind the ocular. Hence, there is a virtual object at a distance $x_2$ from the ocular. The distance between the lenses, $x_1+x_2=f(+)+f'(-)$, where $f(+)$ is the infinity focal length of the positive lens (objective), and $f'(-)$ is the infinity focal length (virtual) of the negative lens. The Galilean telescope is only in focus if $x_2=-f'(-)$ for real objects at infinity. The Galilean telescope must be refocused for observing objects not at infinity. With the Galilean telescope, the virtual image is erect, and the eye relief is as long as any arbitrary distance from the eye to the eye lens (i.e. ocular) of the Galilean telescope, but the eye must still be accurately centered. Positioning the eye at the exit pupil as necessary for the classical telescope or centering the eye on the instrument optical axis or refocusing is a significant limitation to employing any telescope while operating a moving automobile or other vehicle.

Another magnifier with which most people are familiar is the "loupe". A typical loupe is illustrated in FIG. 4. The loupe consists of only one positive lens and does produce erect virtual images that do not require accurate centering or positioning of the eye. However, the viewed object cannot be located at a long distance from the lens, since the object must be viewed inside of focus.

What is needed, especially for use in a moving vehicle, is a magnifier for which objects to be viewed can be at any arbitrarily large distance from the magnifier, that does not require accurate centering of the eye at the exit pupil of the instrument, that does not require centering of the eye on the optic axis of the instrument, that does not require refocusing, and that still provides erect, non-inverted images to the viewer.

SUMMARY OF THE INVENTION

In accordance with preferred embodiments of the invention, apparatus is provided for magnifying the image of distant objects which has the unique feature that, unlike the Galilean telescope, the magnification is largely determined by how far the eye is located from the apparatus. Furthermore, unlike the Loupe, objects to be viewed can be located at any arbitrarily large distance from the apparatus. In addition, the apparatus does not require positioning of the eye at the exit pupil of the instrument; it does not require centering of the eye on the optic axis of the instrument; and it does not require refocusing for different object distances. Still, it provides erect, non-inverted, magnified images to the viewer.

In accordance with the preferred embodiments, an apparatus for magnifying the appearance of a viewed object is provided which includes a positive optical element defining an opto-mechanical axis for the apparatus and having a positive focal length for converging an incoming bundle of rays of light. Also included is a negative optical element that lies on the opto-mechanical axis and that is separated from the positive optical element by a distance, say d, with the negative optical means having a negative focal length that is substantially equal in magnitude to (i.e. having the same absolute value as) the focal length of the positive optical means. The purpose of the negative optical element is for receiving the incoming bundle of rays of light from the positive optical element, and the condition is imposed on the positive and negative optical elements that their individual focal lengths be greater in magnitude than their separation d. The apparatus further includes a housing for holding the positive and negative optical elements. In a preferred mode, the positive optical element is a meniscus lens having positive power, and the negative optical element is a meniscus lens having negative power.

In other preferred embodiments, the opto-mechanical axis of the apparatus is folded between the positive and negative optical elements in order to decrease the lateral extent of the apparatus. Several embodiments are provided which use a single flat mirror or two flat mirrors for the fold. These folded applications are particularly useful for magnifying images in the rear-view mirror of vehicles. A further embodiment is provided where the rear-view mirror itself acts to fold the optic axis. In addition, an embodiment is provided wherein a mirror with positive power is used for the fold as well as to provide power.

Further, as a general concept, an apparatus is provided for viewing a magnified image of an object behind a vehicle when the vehicle has a rear-view mirror attached to it and oriented for the viewer to see the object while facing forward in the vehicle. The apparatus includes an optical magnifier for providing a magnified, erect, virtual image of the object and a connection element attached to the optical magnifier for holding the optical magnifier in a relationship relative to the rear-view mirror such that the magnified, erect, virtual image appears to the viewer in the rear-view mirror.

In another preferred embodiment, a magnifier is provided wherein the positive objective lens is an achromatic doublet. Again the focal length of the positive lens and the negative lens are approximately equal in magnitude and their separation is less than either of their focal lengths. This design makes it possible to achieve a much more compact design, which is useful not only in the rear view mirror configuration, but also as a monocular, as a gun sight, and also can be used to make binoculars. By folding the compact design along its optical axis between the two lenses, a compact magnifying rear view mirror can also be achieved. In this embodiment, the magnification is much less sensitive to the location of the eye.

Another monocular embodiment is presented which introduces a field lens in front of the negative eye lens in order to extend the field of view. This monocular then forms the basis of an entirely new kind of virtual image binocular with an extended monocular field in excess of 20 degrees. Viewing objects through this binocular with extended monocular field is literally stunning. It provides remarkable stereo vision, and hence depth perception. Each eye has a view with extended monocular vision on its side of the field which is seen by that eye only, i.e. there is a center portion where the fields overlap and then there is a non-overlap portion on each side. This is exactly the case for normal unaided human vision or for human vision with eye glasses as well. There, the left eye sees a field which is extended further to the left than does the right eye, and conversely. This stereo vision is achieved in a straight through design using objective lenses that are larger than the interocular distance by cutting flats on the objective lenses and moving them together so that their optic axes are separated approximately by the interocular separation of the eyes.

BRIEF DESCRIPTION OF THE DRAWINGS

Shown in FIG. 1 is a typical classical telescope;

Shown in FIG. 2 is the classical telescope of FIG. 1 illustrating the magnification properties of the apparatus;

Figure 1:
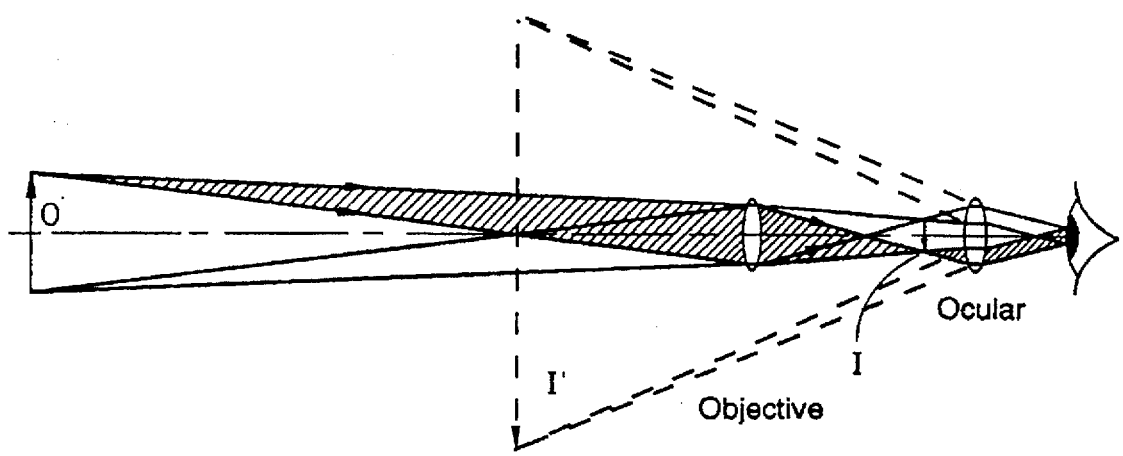
Figure 2:
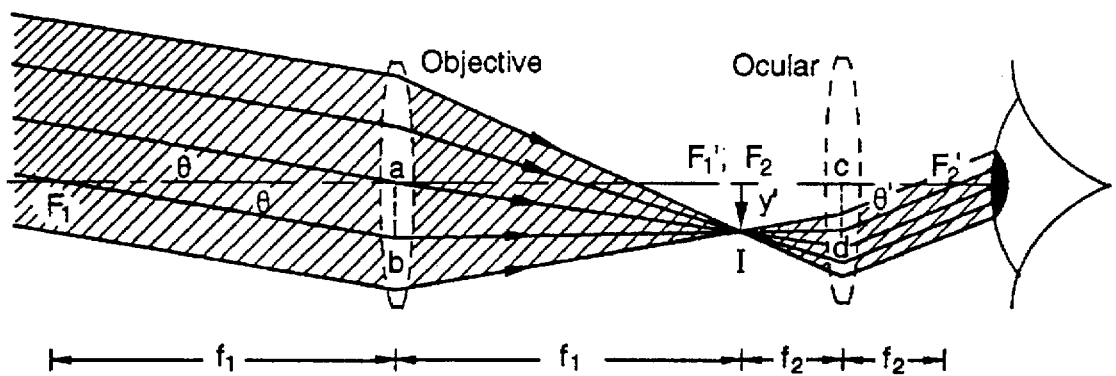
Figure 3:
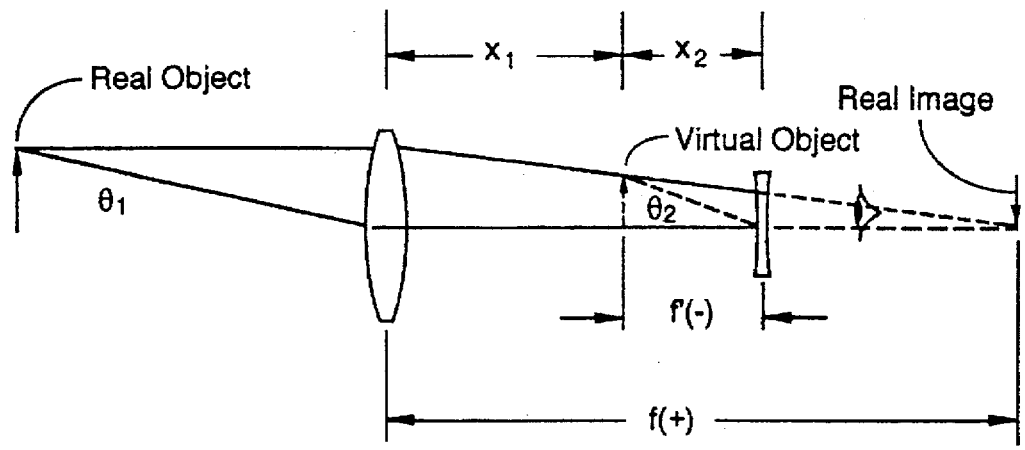
Figure 4:
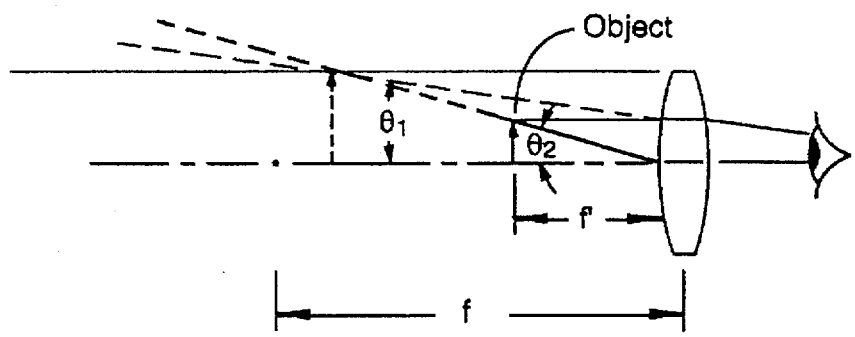
Figure 5:
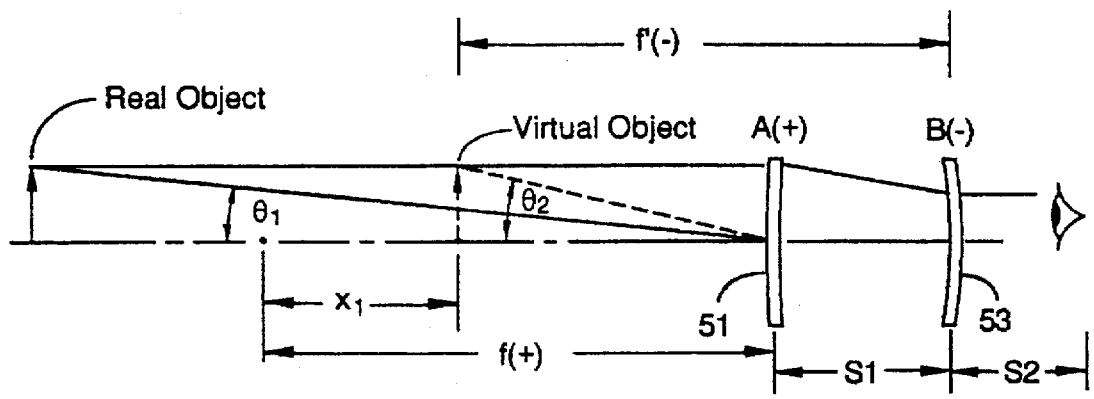
Figure 7:
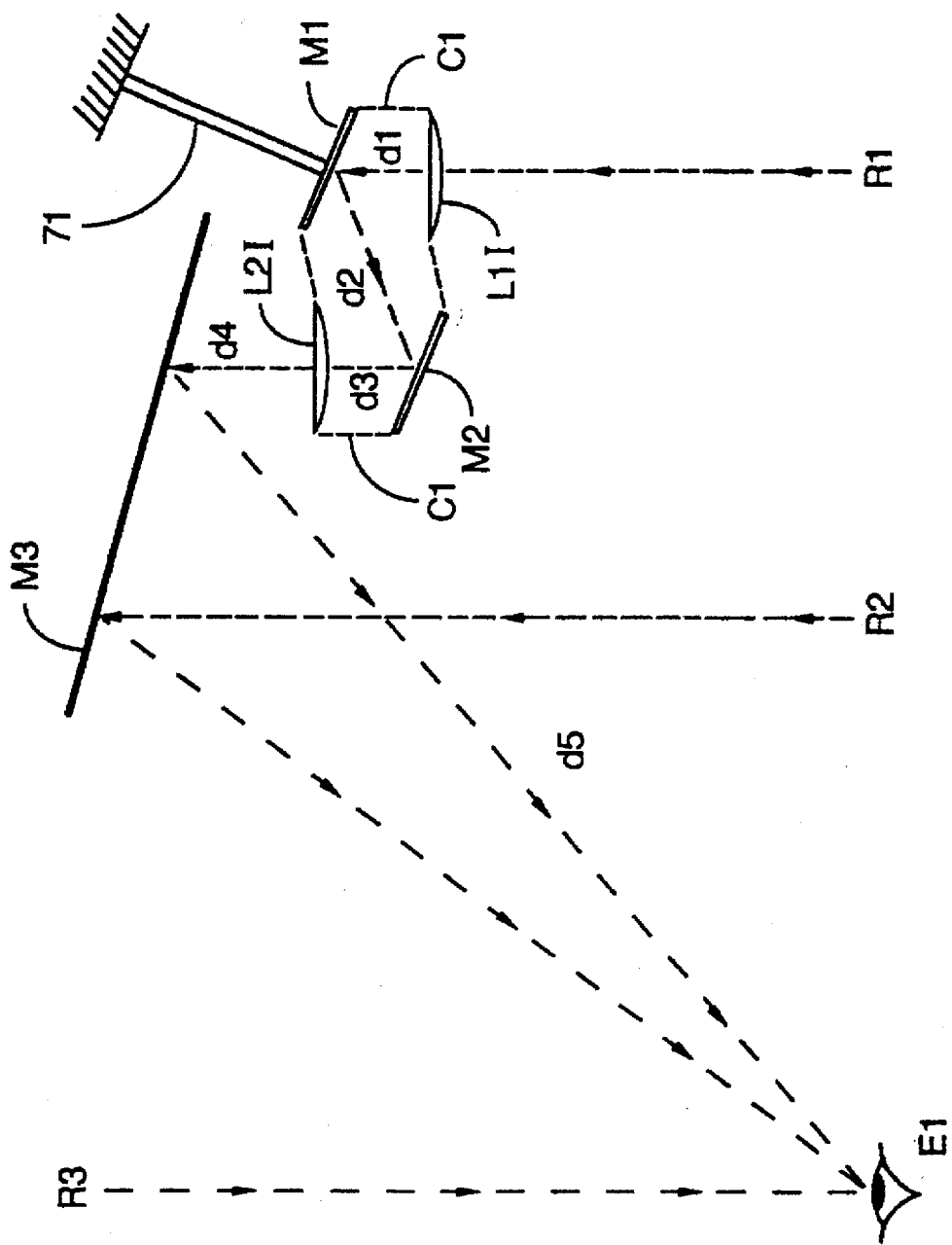
Figure 8:
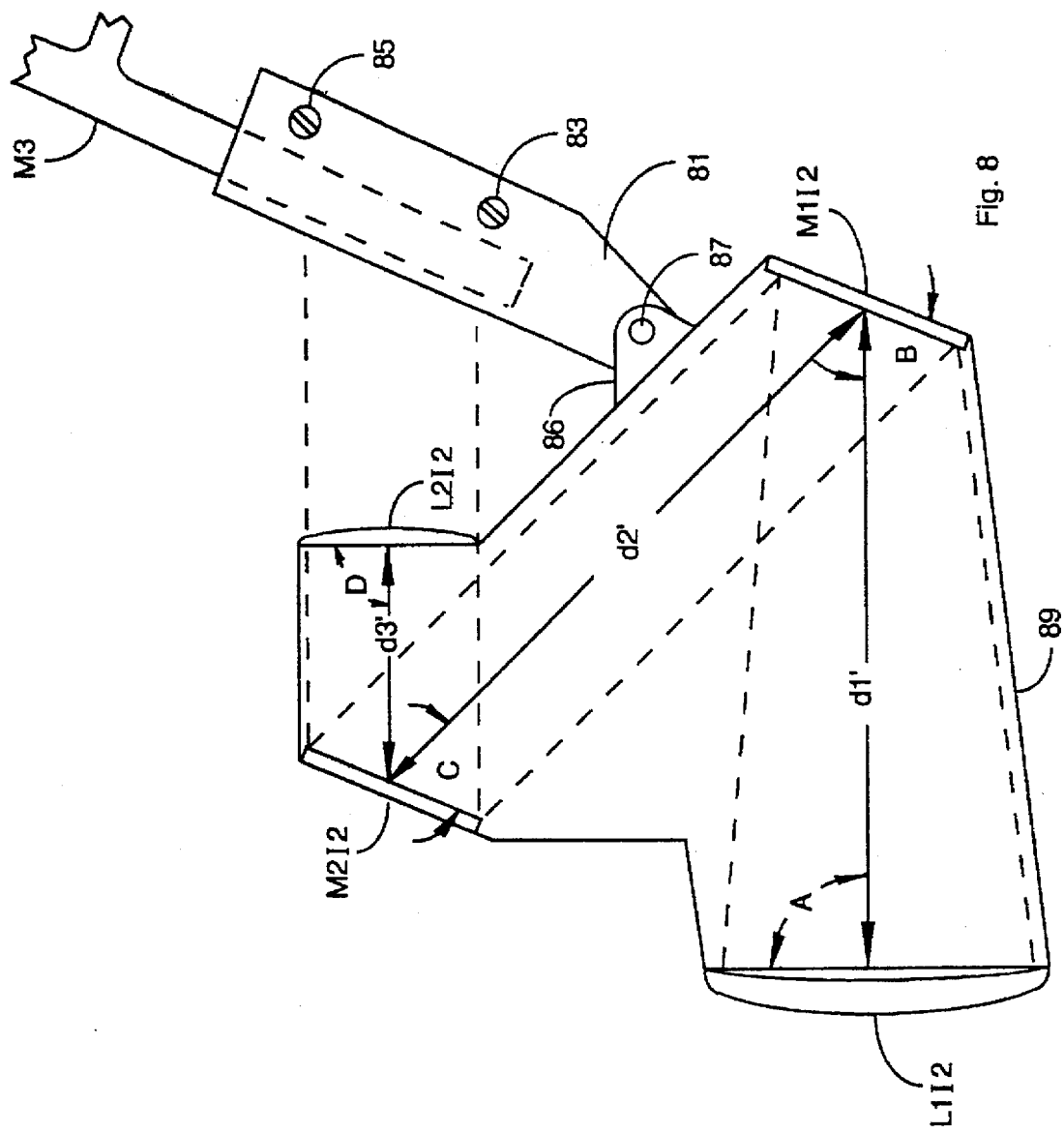
Figure 9:
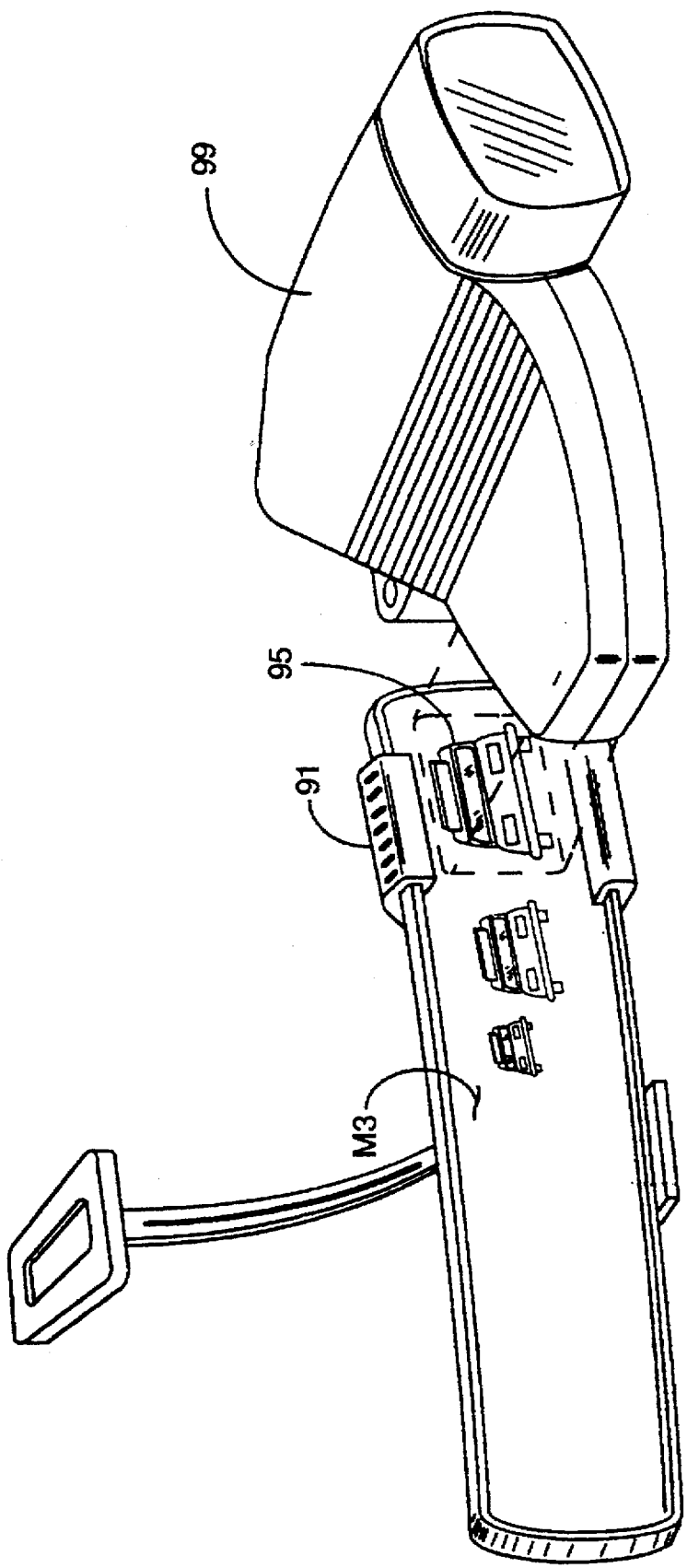
Figure 10:
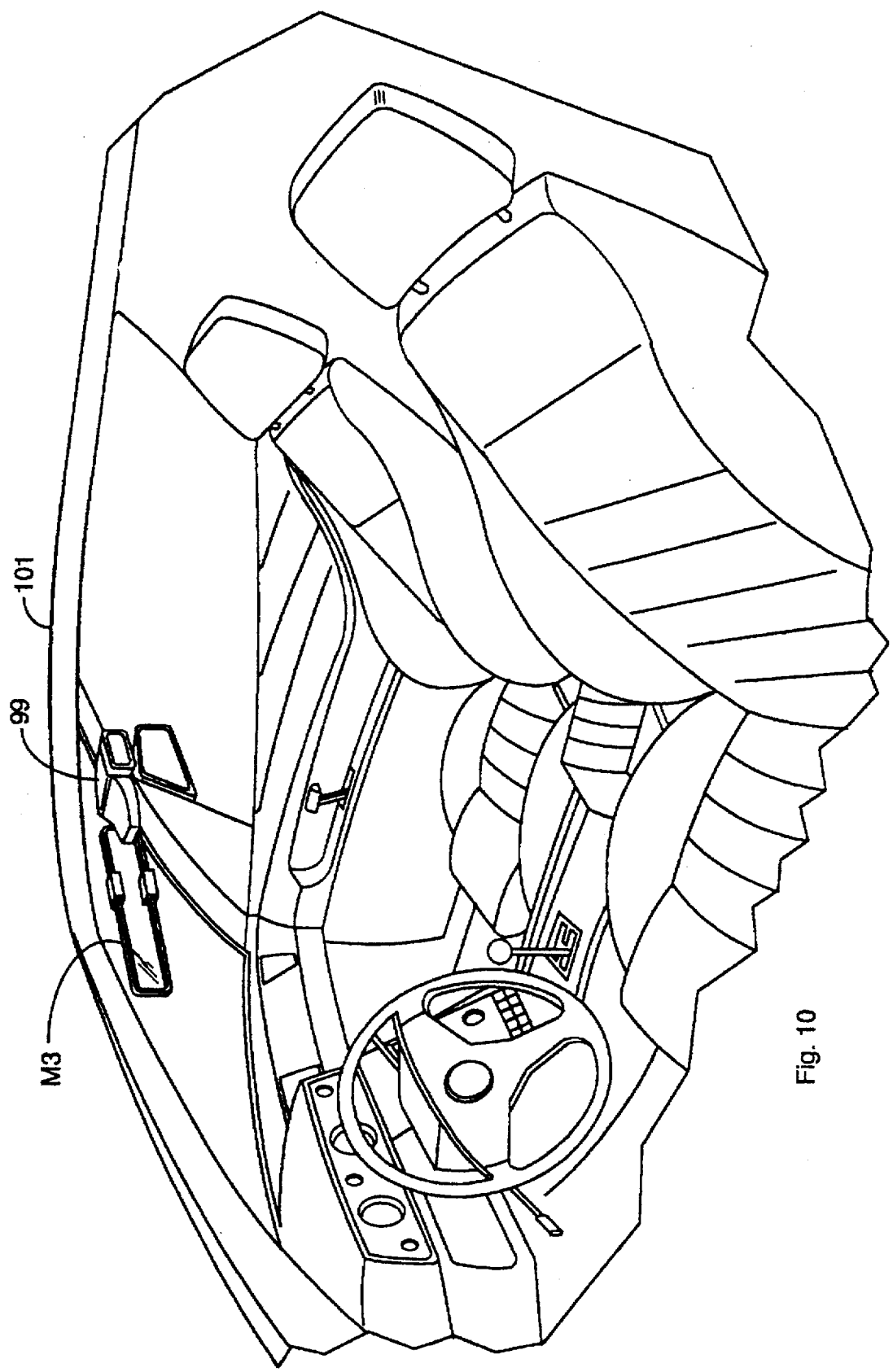
Figure 11:
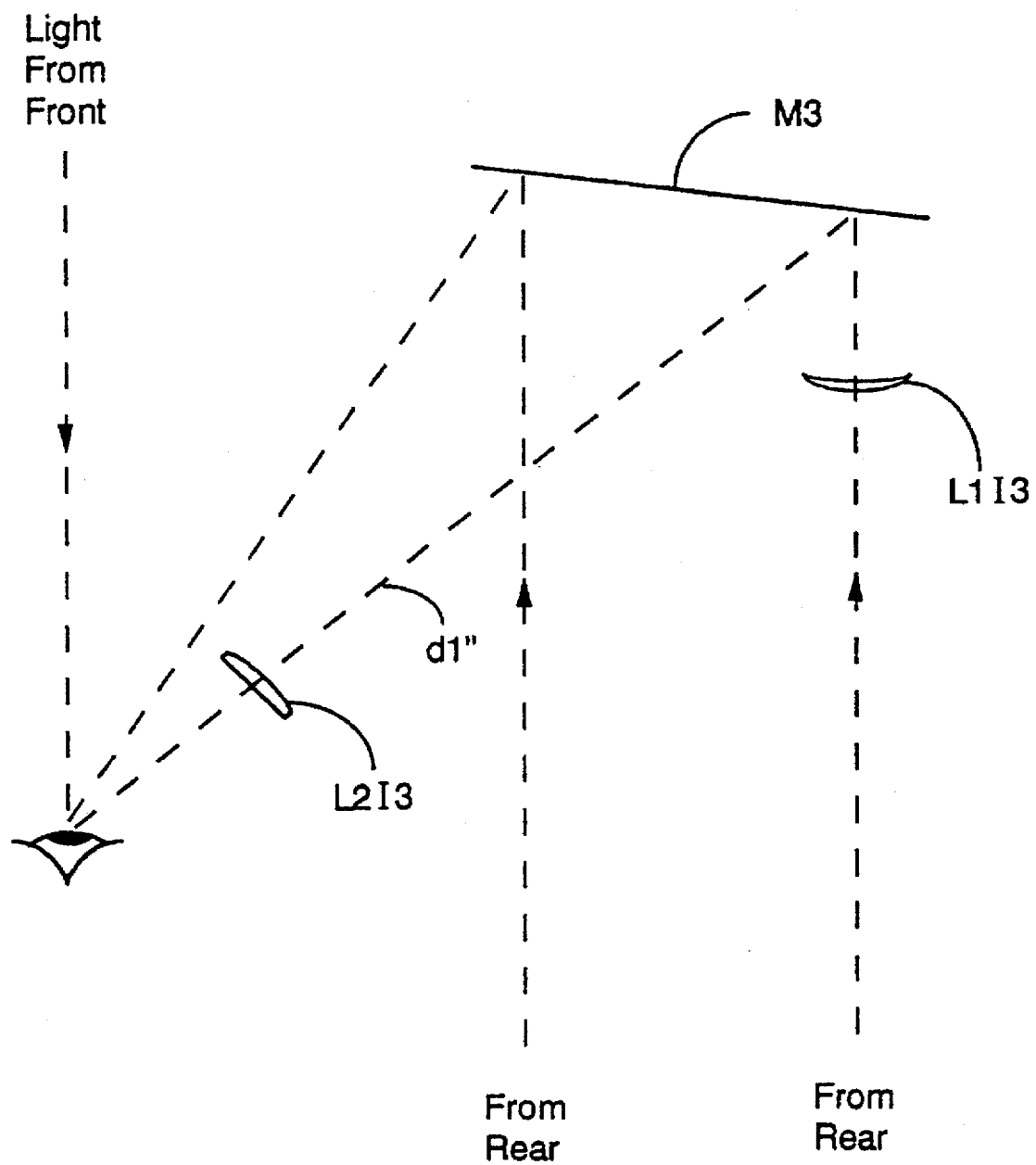
Figure 12:
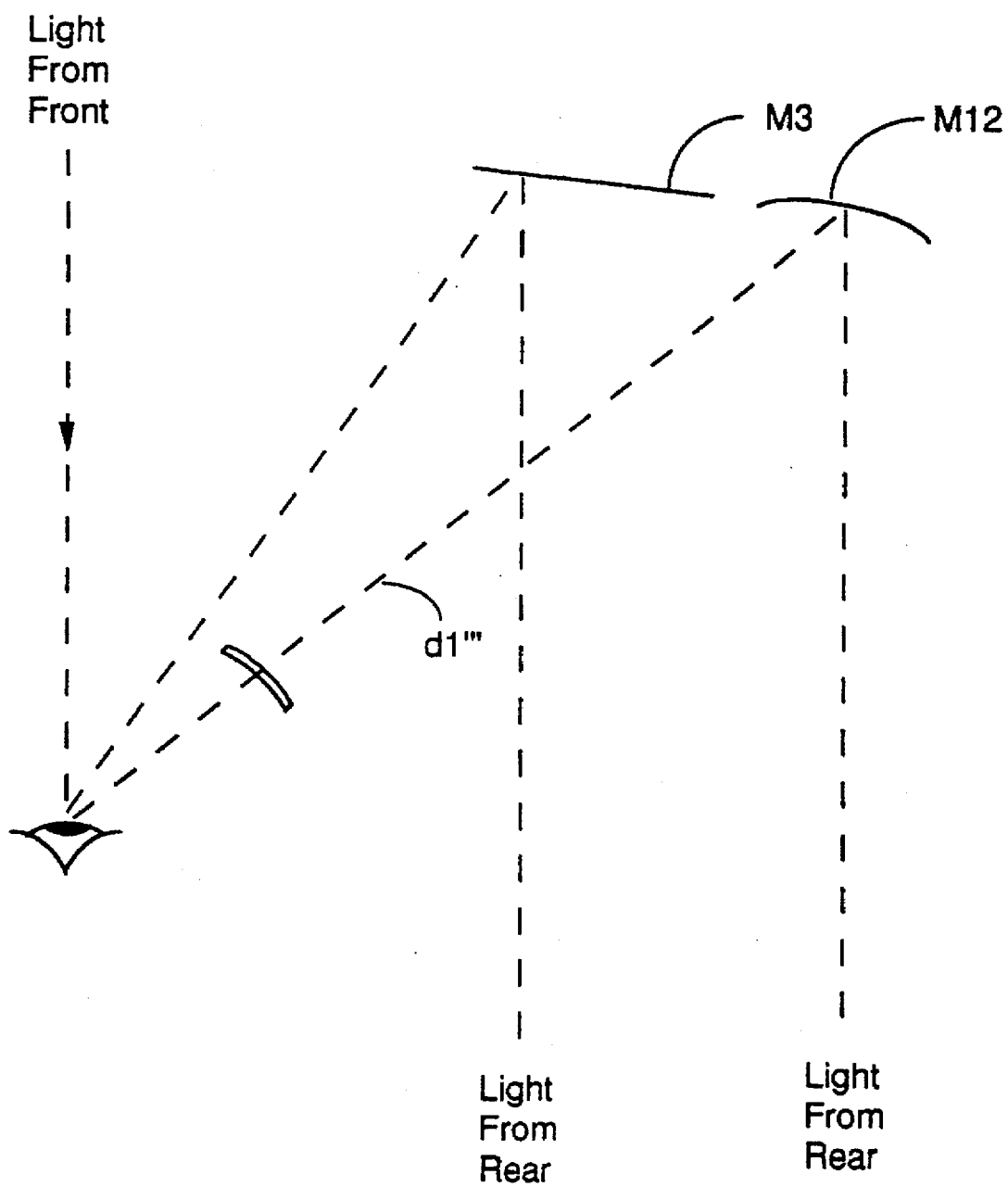
Figure 13A:
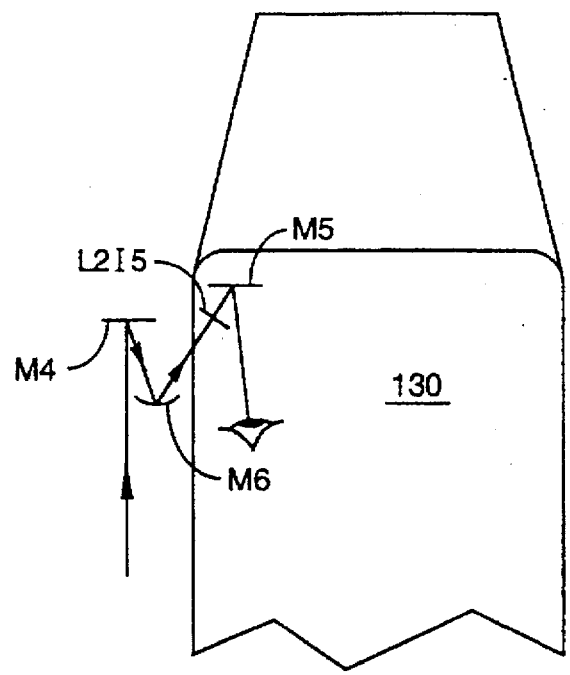
Figure 13B:
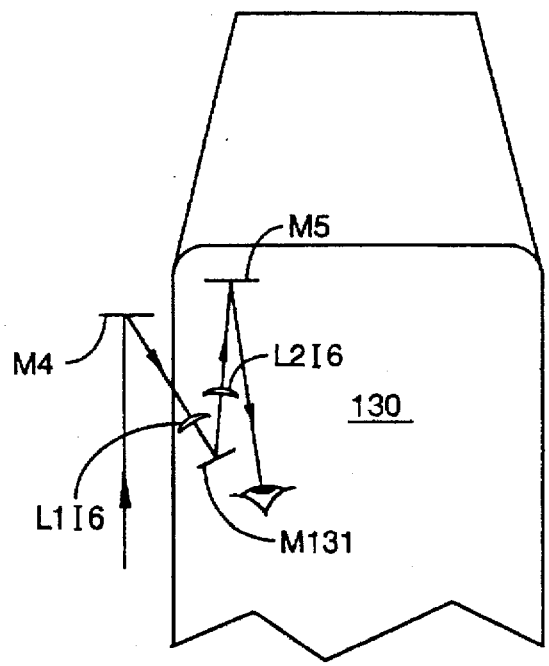
Figure 14:
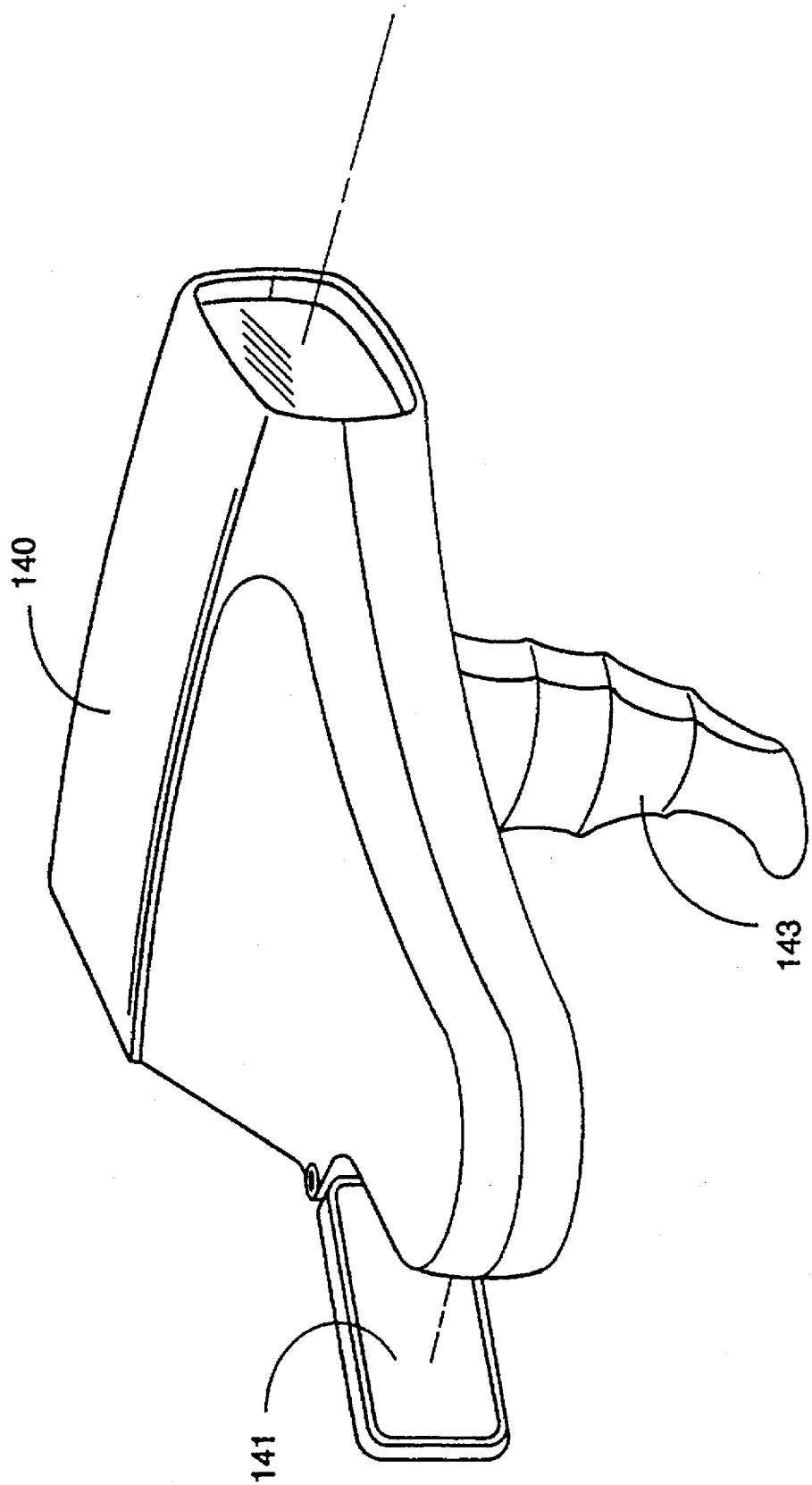
Figure 15A:
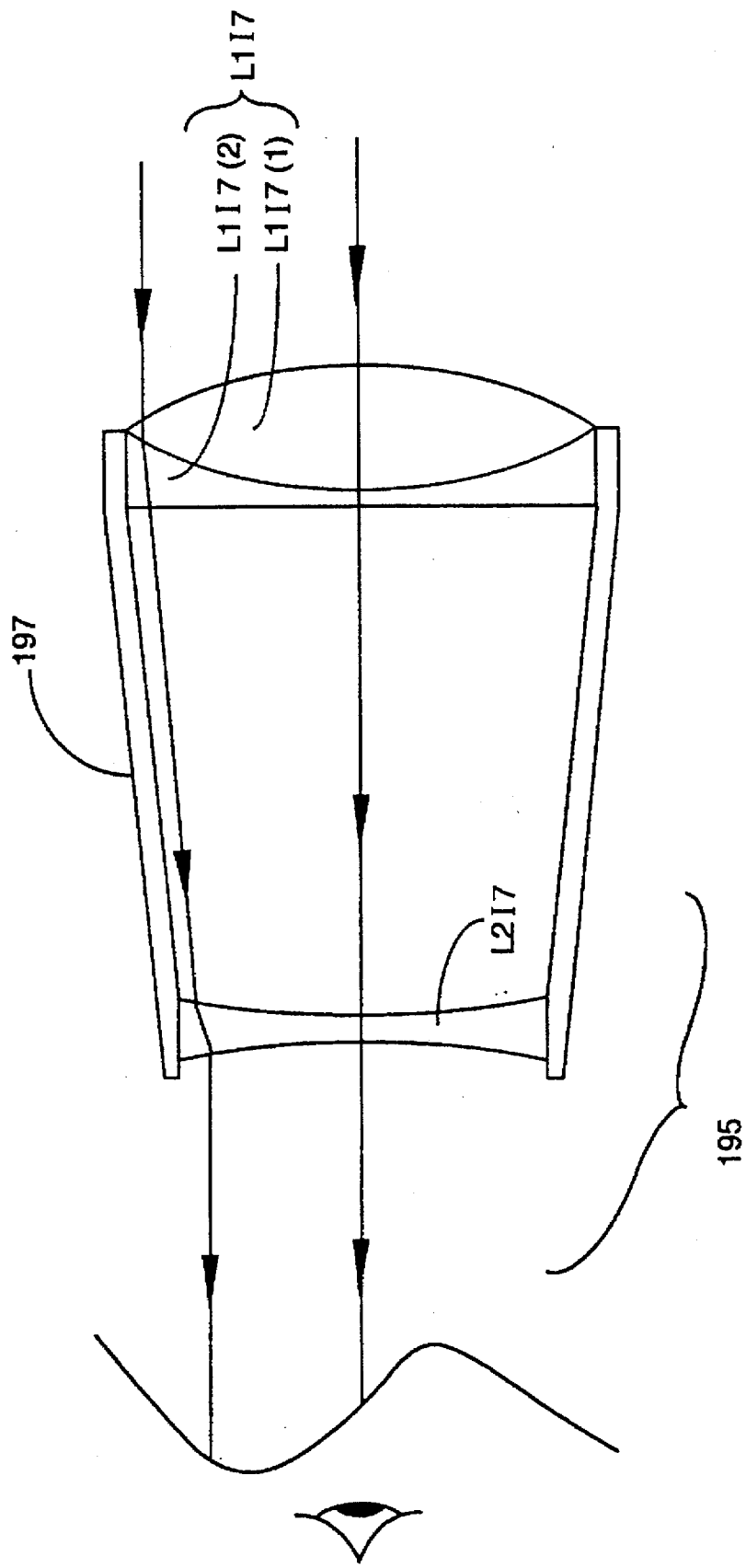
Figure 15B:
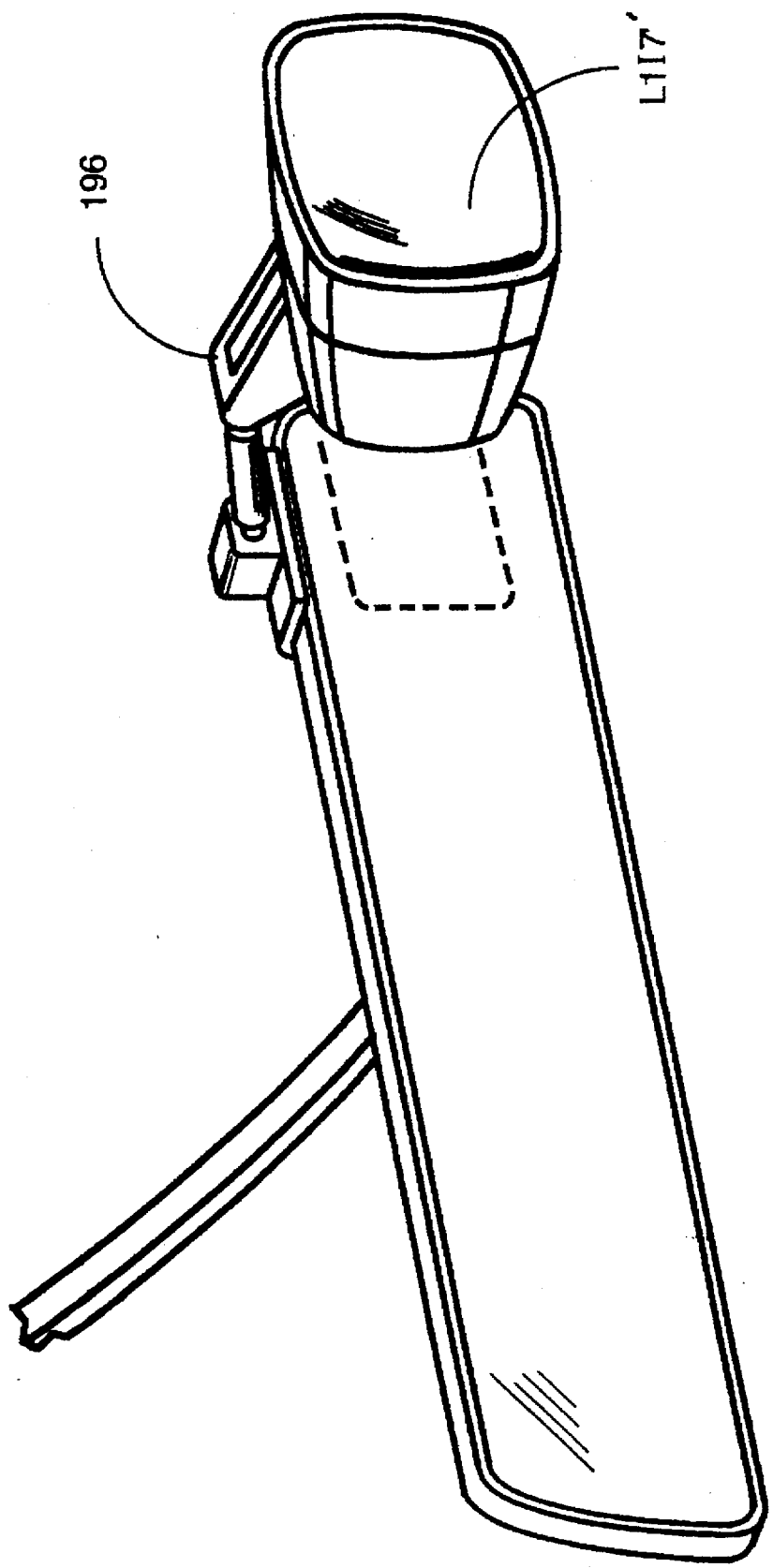
Figure 16:
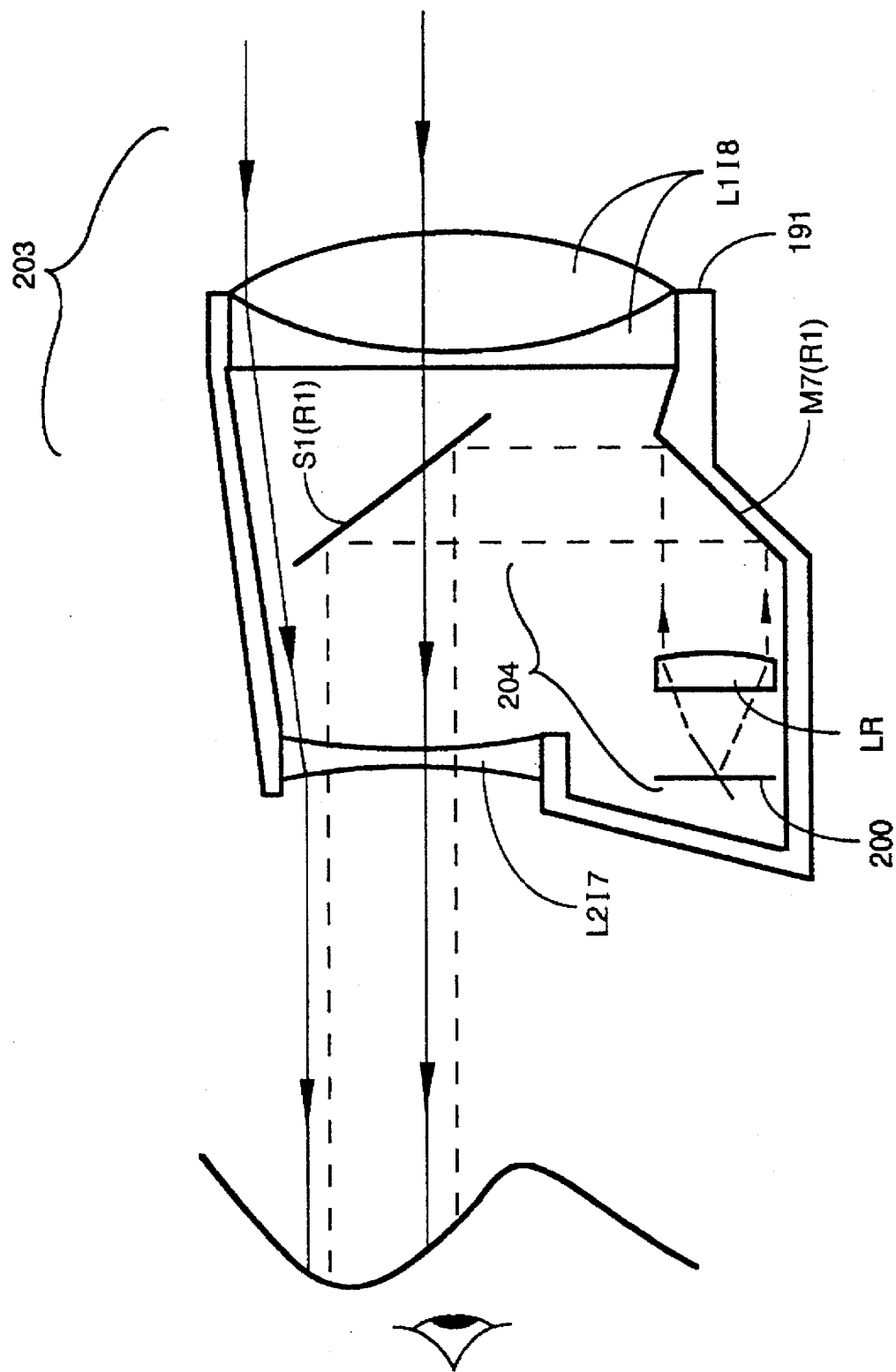
Figure 17A:
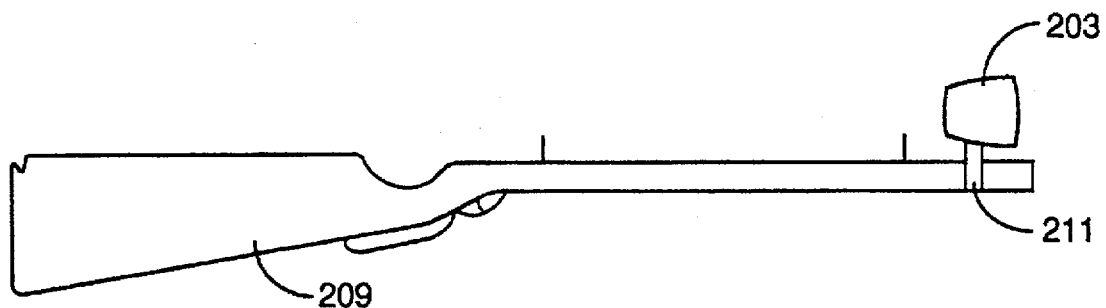
Figure 17B:
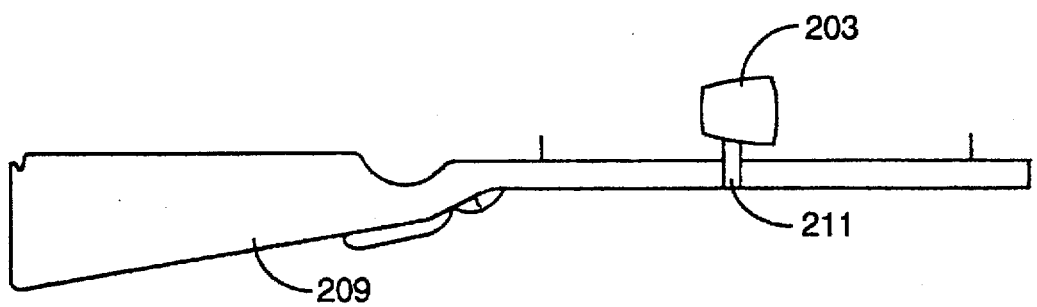
Figure 17C:
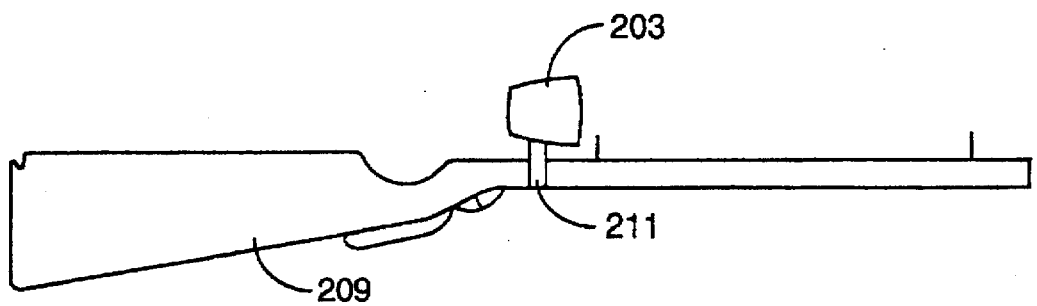
Figure 18:
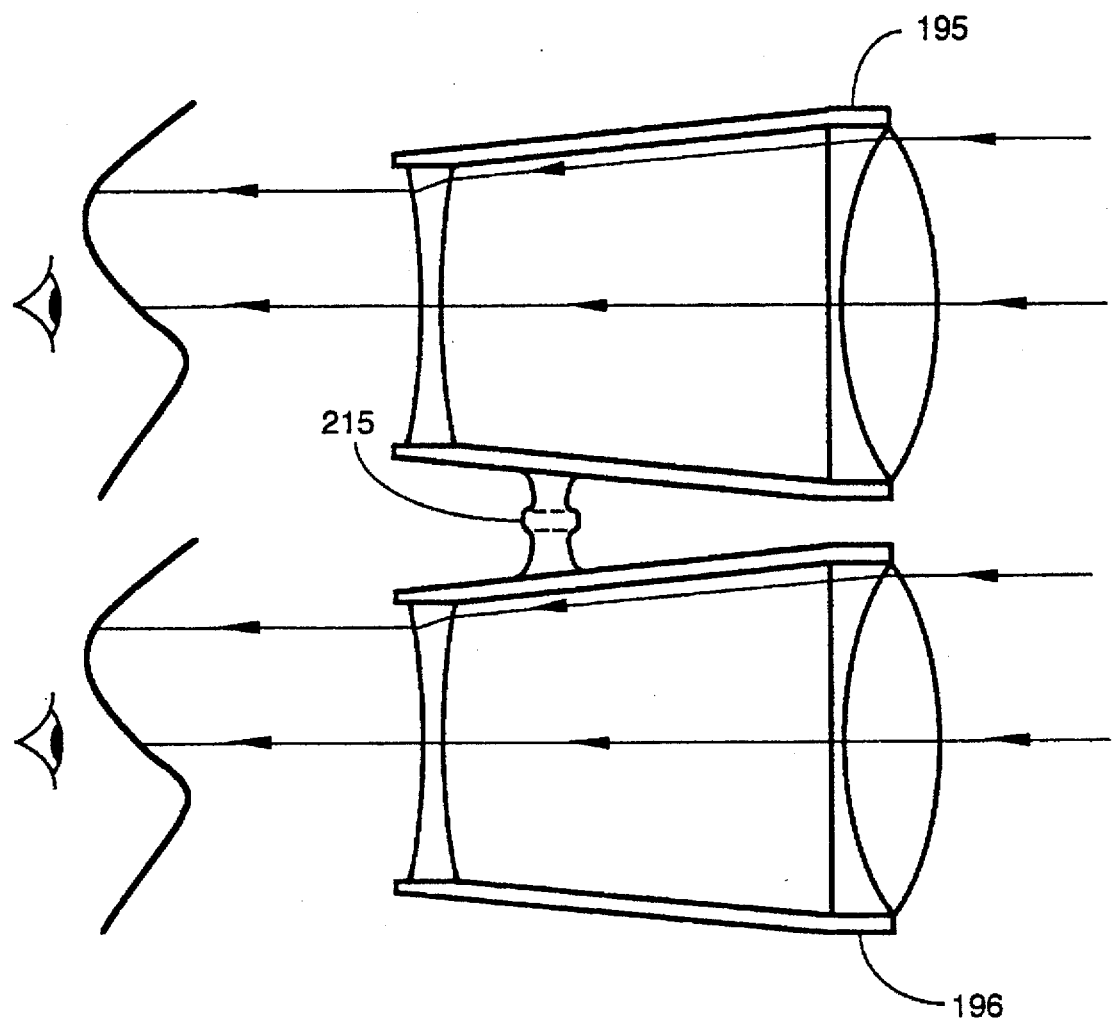
Figure 19:
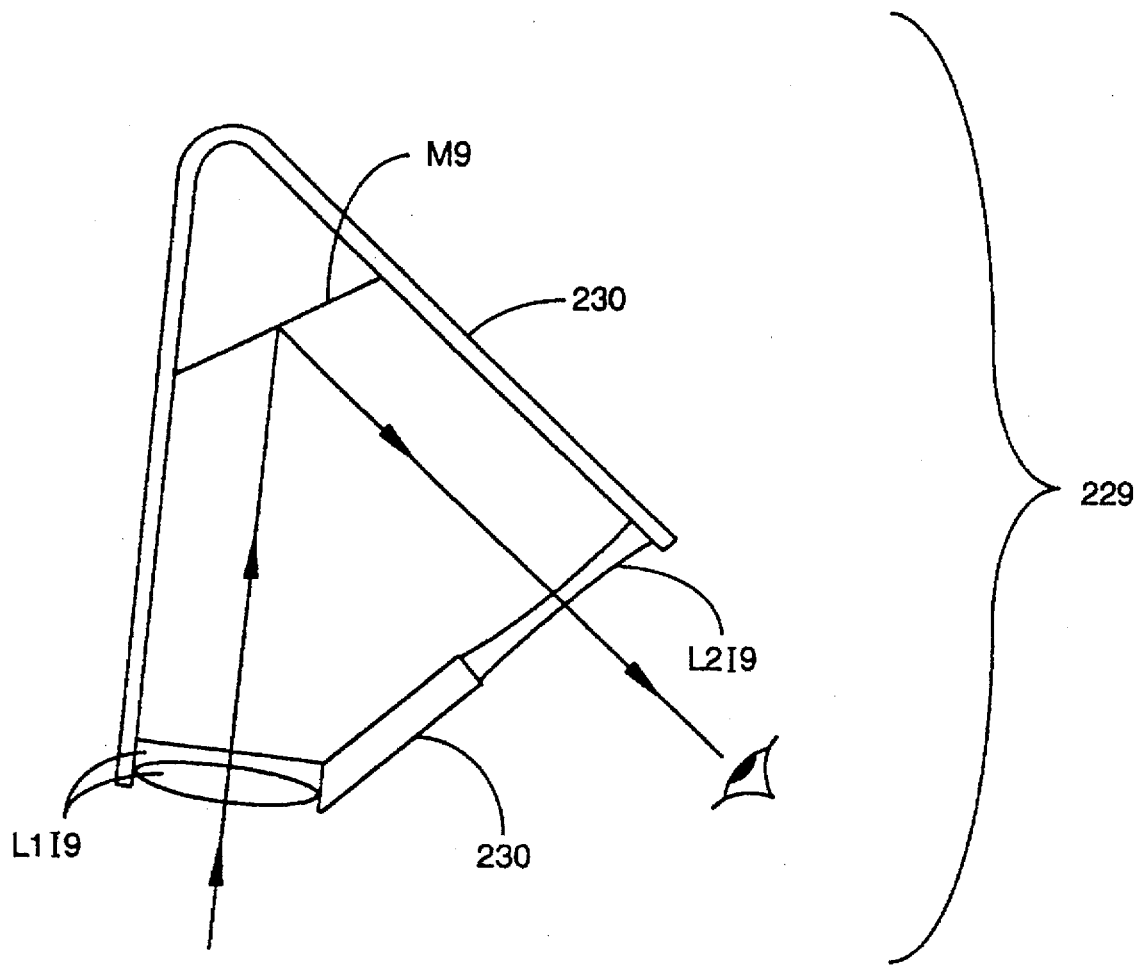
Figure 20:
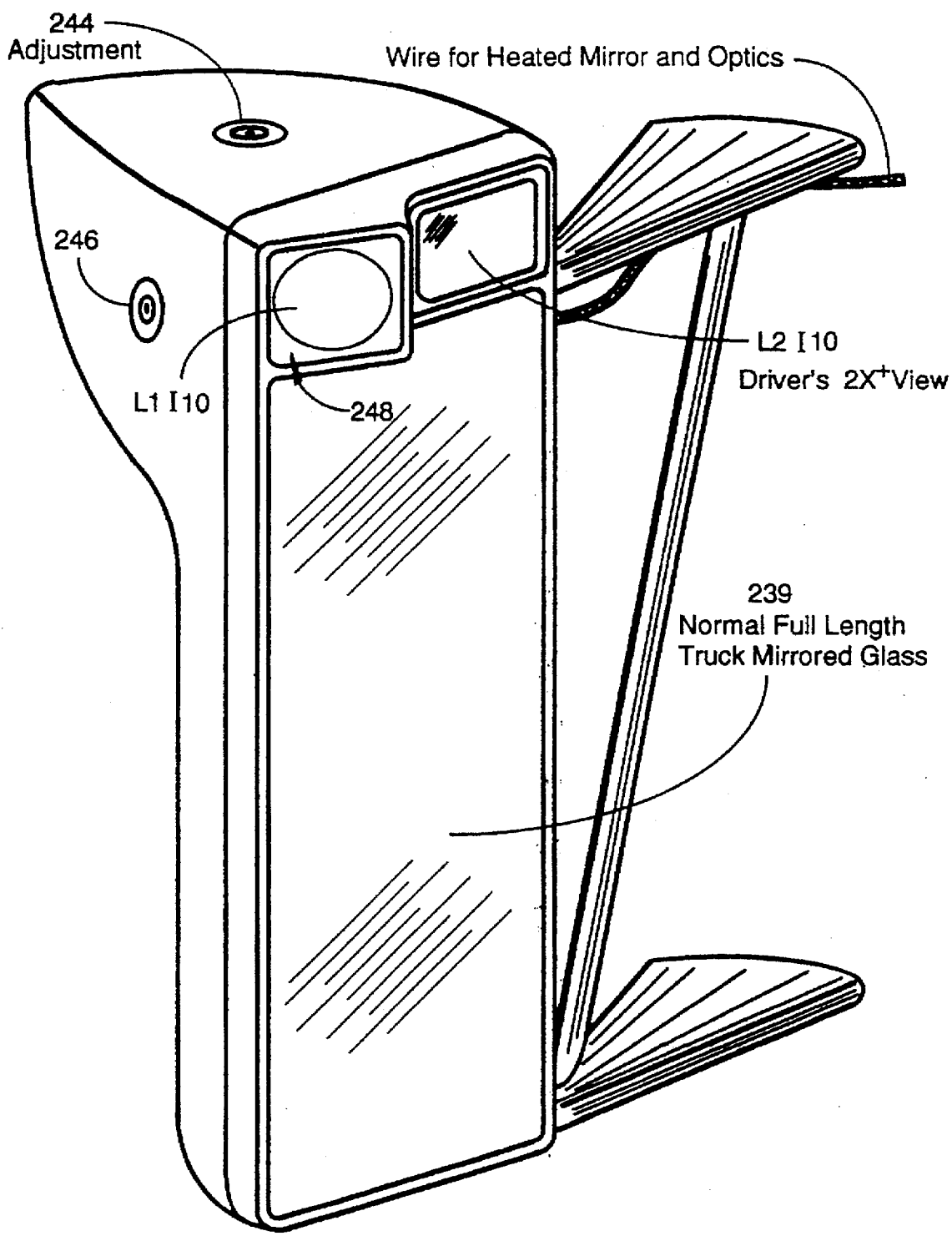
Figure 21:
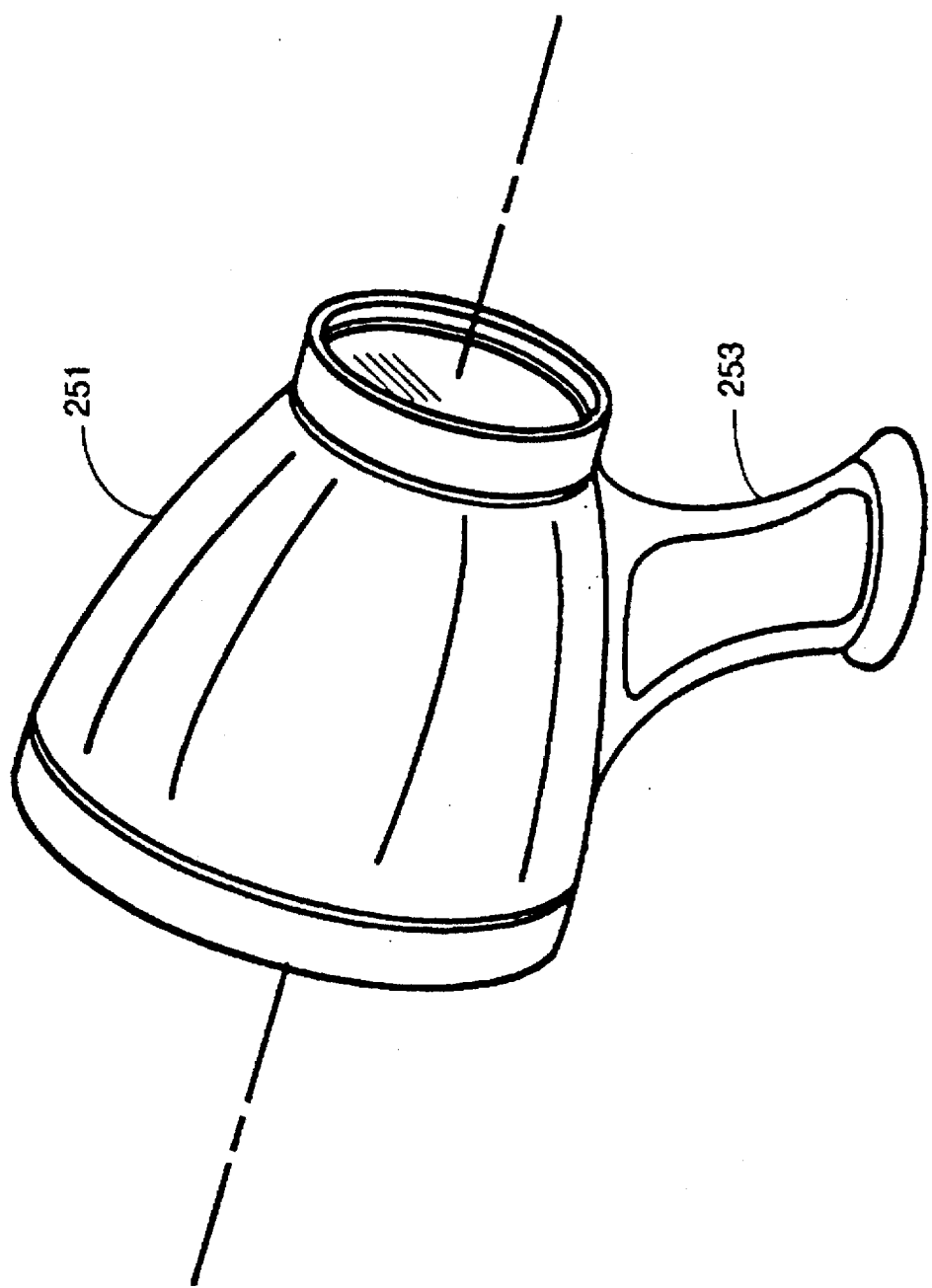
Figure 22:
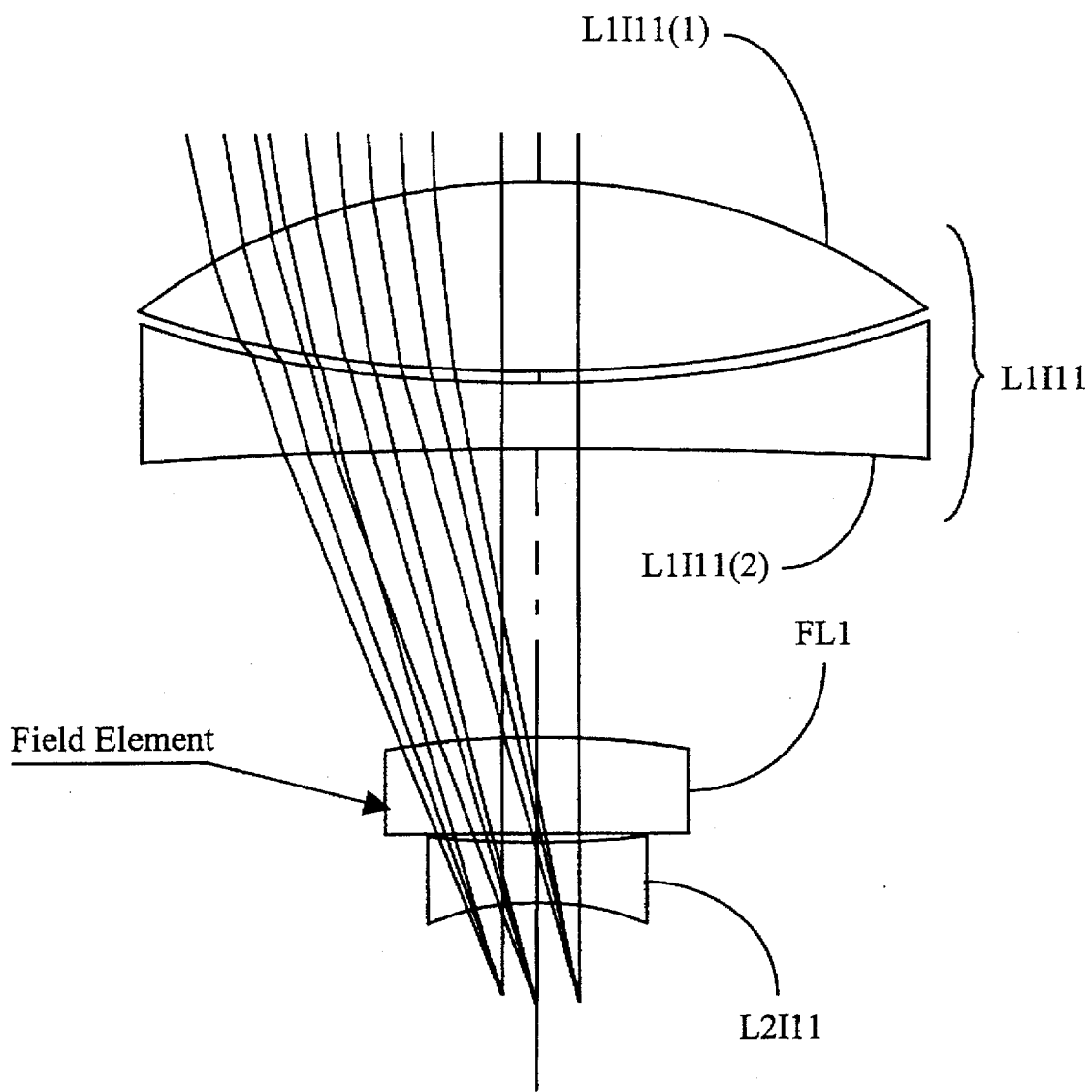
Figure 23:
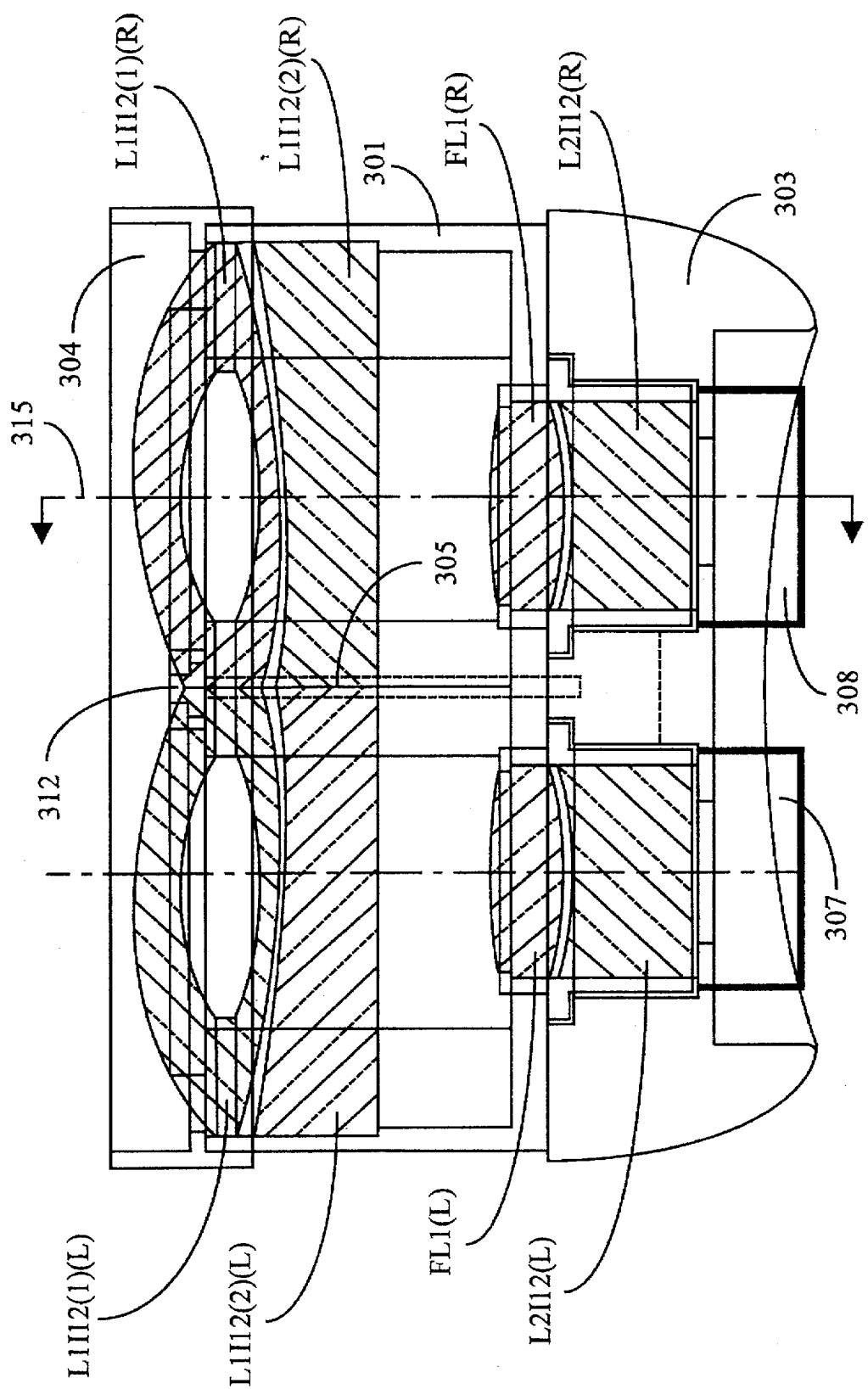
Figure 24:
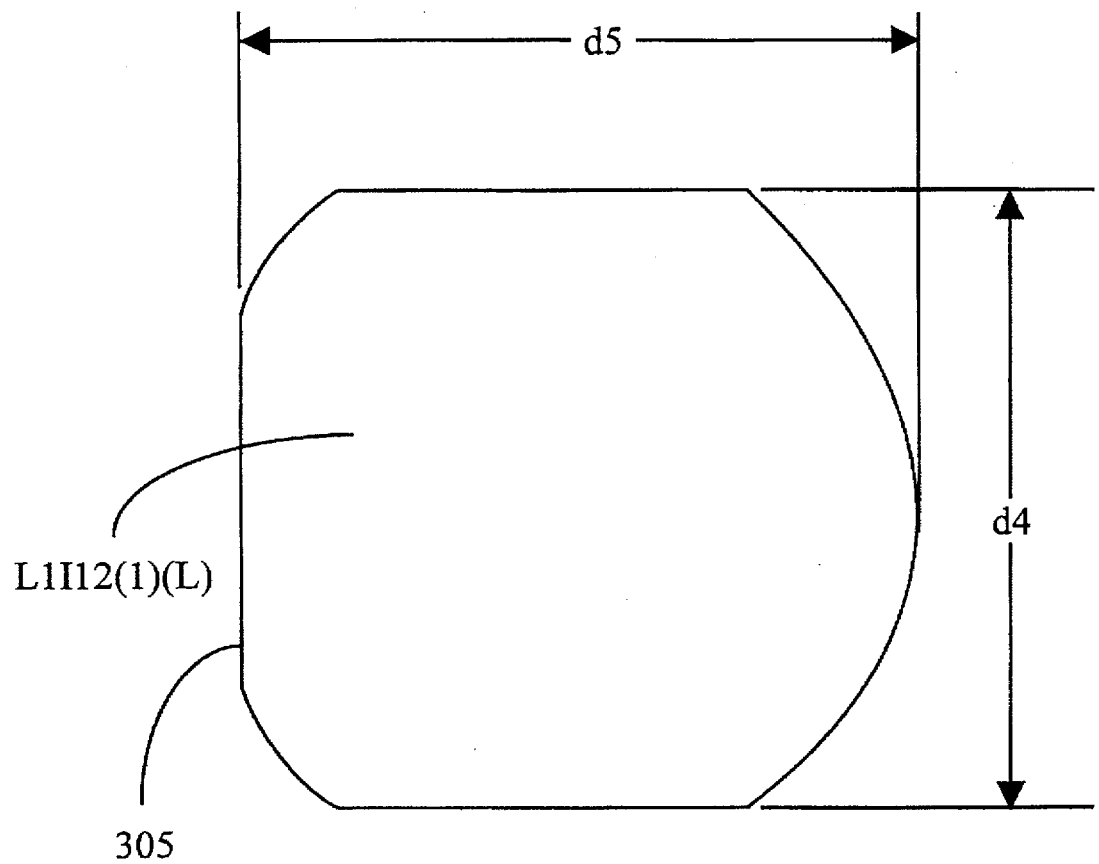
Figure 25:
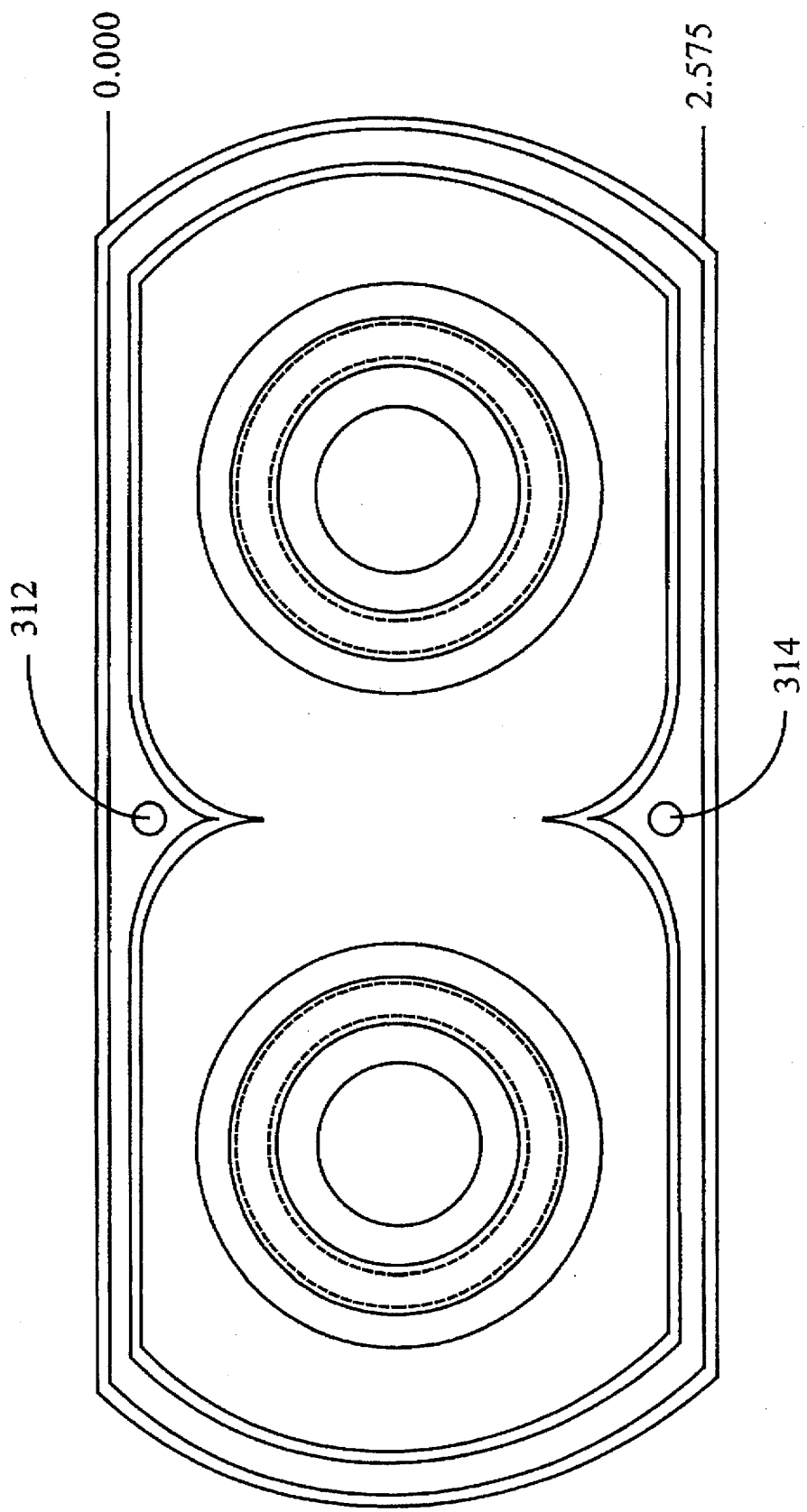
Figure 26:
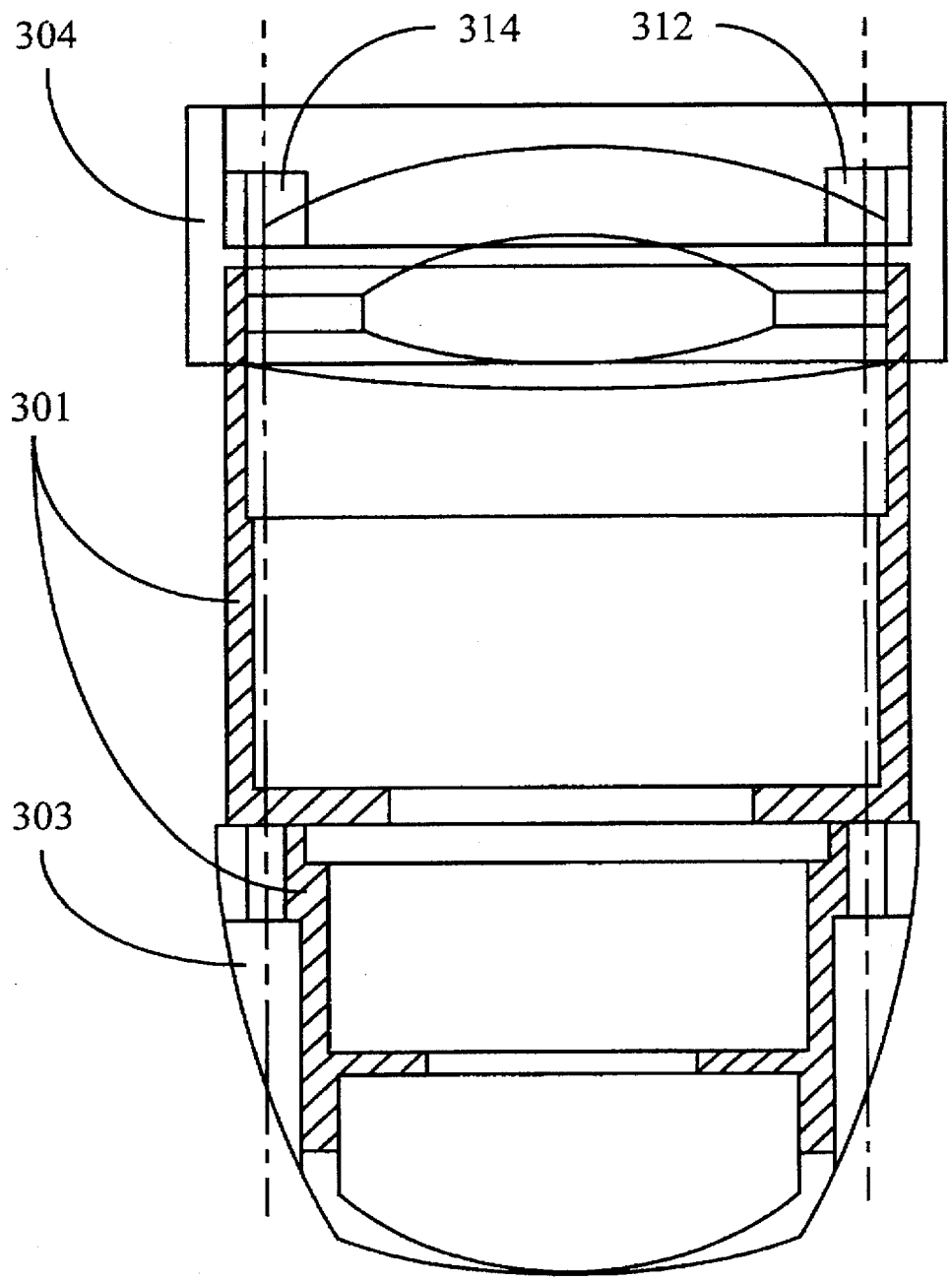
Figure 27:
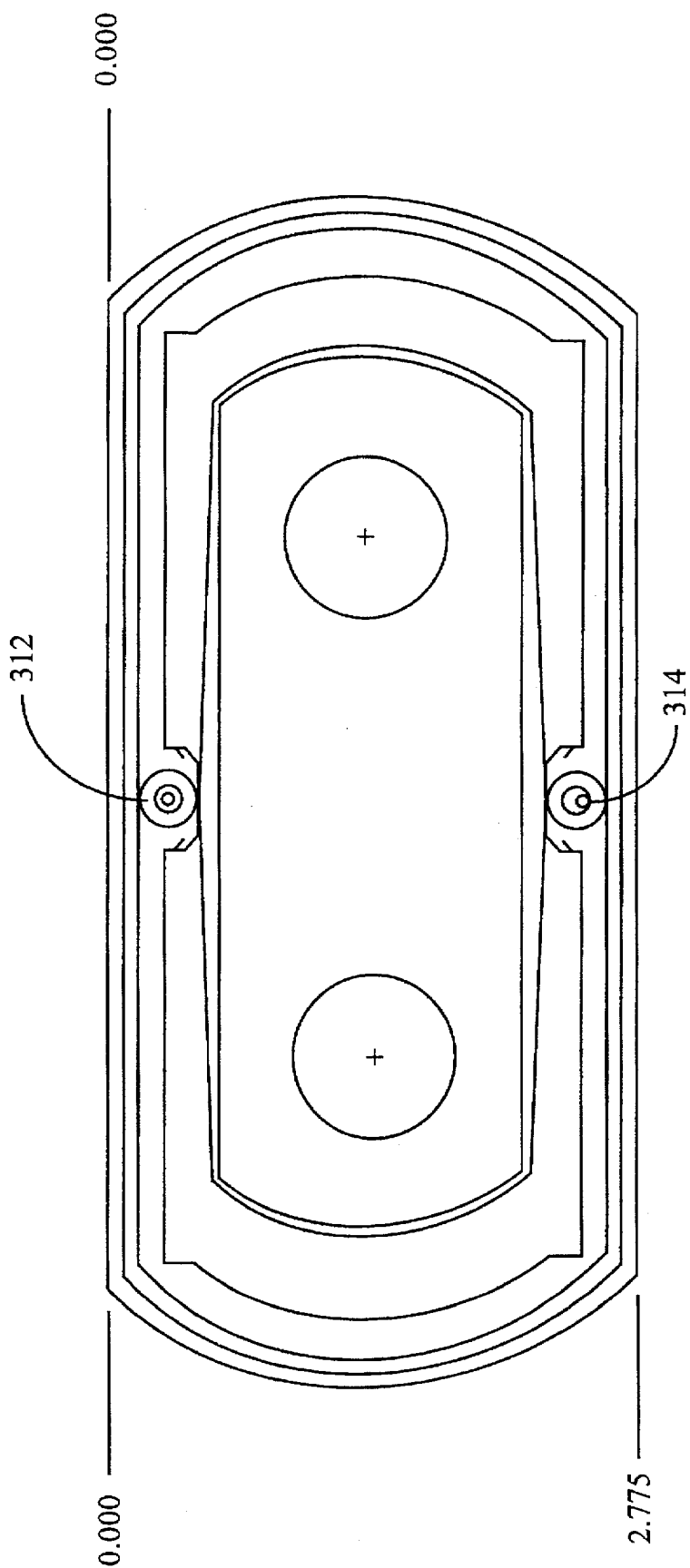

Shown in FIG. 3 is a Galilean telescope;

Shown in FIG. 4 is a tyical magnifying glass, called a Loupe;

Shown in FIG. 5 is first preferred embodiment of the invention;

Shown in FIGS. 6A, 6B and 6C is a comparison of the first preferred embodiment of the invention with a Galilean telescope and a Loupe;

Shown in FIG. 7 is a first folded embodiment of the invention such as might be used in a motor vehicle;

Shown in FIG. 8 is an alternative folded embodiment of the invention;

Shown in FIG. 9 is a perspective view of a folded embodiment of the invention;

Shown in FIG. 10 is a perspective view of the embodiment of FIG. 9 as it would appear in an automobile;

Shown in FIG. 11 is a top view of an alternative preferred embodiment of the invention which has only one fold and uses the rear-view mirror of a vehicle for that fold and employs an eye lens that is relatively near the eye;

Shown in FIG. 12 is a top view of an alternative preferred embodiment of the invention which also has only one fold, but uses a concave mirror both for the fold and for power, and uses an eye lens that is relatively near the eye;

Shown in FIG. 13A is an alternative embodiment that is useful for rear-view mirrors that are located outside of the vehicle;

Shown in FIG. 13B is a second embodiment that is useful for rear-view mirrors that are located outside of the vehicle;

Shown in FIG. 14 is an alternative embodiment that is a hand carried magnifier for viewing to the rear;

Shown in FIG. 15A is a cross-sectional view of a magnifier according to the invention;

Shown in FIG. 15B is a typical mounting arrangement for the embodiment of FIG. 15A;

Shown in FIG. 16 is a cross-sectional view of a magnifier according to the invention that is particularly adapted for use on rifles and hand-guns;

Shown in FIG. 17A, FIG. 17B, and FIG. 17C are various mounting positions on a rifle for a magnifier according to the invention;

Shown in FIG. 18 is a pair binoculars according to the invention;

Shown in FIG. 19 is a compact magnifying rear view mirror according to the invention;

Shown in FIG. 20 is a truck mirror with the rear view mirror of FIG. 19 integrated therewith;

Shown in FIG. 21 is a magnifier according to the invention which is especially adapted for being hand held;

Shown in FIG. 22 is monocular according to the invention which exhibits an extremely wide field of view;

Shown in FIG. 23 is a plan view of a binocular constructed using two monoculars of FIG. 22;

Shown in FIG. 24 is the shape of an objective lens for the binoculars of FIG. 23;

Shown in FIG. 25 is front view of the binoculars of FIG. 23;

Shown in FIG. 26 is a side view of a case for holding lenses in their proper place for the binoculars of FIG. 23; and Shown in FIG. 27 is a view of the binoculars of FIG. 23 from the perspective of a user;

DESCRIPTION OF THE PREFERRED EMBODIMENTS

Shown in FIG. 5 is a first preferred embodiment of the invention in unfolded form. The apparatus is made up of an objective lens 51 having positive power and an eye lens 53 having negative power. In the preferred mode, objective lens 51 and eye lens 53 are ordinary spherical ophthalmic (meniscus) lenses, typically constructed of Crown Glass or plastic. Those skilled in the art, however, will appreciate that aspheric lenses could also be used in order to reduce distortion. For this example, lens 51 has been chosen to have a positive power of 0.75 Diopters (52.36 inches or 1.33 meters) and lens 53 has been chosen to have a negative power of −0.75 Diopters, and in general the lenses are chosen to have approximately equal and opposite powers. The distance s1 between the lenses has been chosen as 10 inches and the distance s2 from lens 53 to the eye has been chosen as 22 inches, so that the objective lens and the eye lens are placed such that the eye is always inside focus of the objective lens.

The focal length of this first preferred embodiment can be calculated as follows using the lens maker's formula:

$$FL = f51 \cdot f53 / (f51 + f53 - D),$$

where f51 and f53 are the focal lengths of lenses 51 and 53, and D is the distance between the lenses. In this example D=10 inches, or 4 Diopters. Substituting into the above formula, one calculates that the focal length of the apparatus as FL=7.11 meters, an exceedingly long focal length. A further important point is that since the focal lengths of the two lenses are equal and opposite in sign, the combined focal length of the apparatus is solely determined by the separation of the lenses. The magnification of the apparatus can be estimated simply as the positive contribution due to the positive objective lens summed with the negative contribution due to the negative eye lens. In this example, an approximation of the contribution of each element can be made as the ratio of its focal length to the distance from its focal point to the eye, because the elements are each used to obtain virtual magnification:

$M(51) = f51/(f51-s1-s2) = 1.33/(1.33-0.88) = 2.5;$ $M(53) = -f53/(f53-s2) = -1.33/(1.33+0.55) = -0.707;$ and $M(1) = M(51) + M(53) = 1.80,$ where M(51) and M(53), are the magnifications of lenses 51 and 53 respectively, and M(1) is the total magnification of the first preferred embodiment. Here, it is apparent that the magnification is very strongly controlled by the distance of the eye from the objective lens, the farther away the eye is from the objective lens the larger the magnification. This result is in stark contrast to the typical Galilean telescope, since as indicated earlier the magnification in that case is the same as for a classical telescope, i.e. merely the ratio of the focal lengths of the positive and negative lenses. If the focal lengths of a Galilean telescope were equal in magnitude, the "magnification" would be 1, i.e. there would be no magnification. Furthermore, in the Galilean case, the magnification has absolutely nothing to do with the location of the eye relative to the objective lens.

Another important feature of the invention is its eye accomodation, i.e. the ability of the eye to focus in combination with the apparatus. To illustrate that feature, the focal length of the magnifier/eye combined systems will now be compared with the focal length of the eye alone. Using the lens maker's formula to compute the combined focal length, one obtains:

$FL_{combo} = f_m f_{eye}/(f_m + f_{eye} - d)$, where $f_m$ is the focal length of the magnifier (7.11 in this example), $f_{eye}$ is the focal length of the eye, and d is the distance from the eye to the magnifier. In practice, the focal length of the eye is about 1 inch (1/40 of a meter), and a typical distance d is about 27 inches (as will be understood when the folded rear vision embodiment is described). This yields a focal length of the combination of 1.10 inches, which is only 10% larger than for the eye alone. Those skilled in the art will realize that a wide range of eyes can easily accommodate this very small change in focal length.

Before proceeding with descriptions of additional embodiments of the invention, it is useful to review some of the important differences between the present invention and the Galilean telescope. The Galilean telescope is comprised of a positive objective lens element and a negative eye lens element, with these elements separated such that their foci are coincident, i.e. the infinity focal point of the positive lens is made to coincide with the (virtual) infinity focal point of the negative eye lens in order to obtain infinity focus with the Galilean telescope. Other objects may be brought into focus but the separation distance between the positive and negative lens elements must be changed (increased) to accomplish focus of nearer objects, and accurate focusing of Galilean telescopes for near objects is actually quite sensitive to proper separation and placement of the lenses. The magnifying power of the Galilean telescope is determined by the ratio of these focal distances (just as in the classical case). Hence, for any magnification other than unity, the focal length of the objective cannot be equal in magnitude to the focal length of the eye lens.

For the present invention however, the positive objective lens and the negative eye lens are of equal (or nearly so), but opposite powers, and the magnifying power of the invention is largely determined by the distance of the eye from the objective lens and has some sensitivity to the separation of the lens elements. A surprising result of this combination is that objects are always simultaneously in focus regardless of their distance and regardless of the separation of the lens elements. The foci of the elements do not thus coincide; in fact, the foci are separated by a distance exactly equal to the (arbitrarily) chosen separation of the lens elements, and the optical power (and focal length) of the telescope may be arbitrarily selected by simply varying the separation of the lens elements while keeping the eye at a fixed location relative to the objective lens, or by varying the distance of the eye from the device, or by varying both distances simultaneously. Furthermore, varying these distances can be done while viewing through the instrument, since all objects at all distances remain continuously in focus. This remarkable result is unique to this invention.

Another useful comparison relates to focal length. Application of the lensmakers' formula to calculate the focal length of a Galilean telescope having equal and opposite power lenses yields the result that the focal length is infinity (i.e. the Galilean would be afocal). However, as can be seen from the equations above, application of the lensmakers formula to the present invention yields the completely different result that the focal length, $F.L. = f^2/x$, where f is the magnitude of the focal length of either element, and x is the separation between the elements. Hence, for even moderate changes in the separation of the objective lens and the eye lens, focusing is not very sensitive to the magnitude of x.

Another important feature of the invention is that the objective lens and the eye lens are placed such that the eye is always well inside the focus of the objective lens. This is quite different from the Galilean telescope where the focal point of the objective is always in front of the eye. It is this unique feature of the invention that yields the surprising result that the eye need not be accurately centered for easy observation. As a practical matter, the optic axis of the apparatus is determined by the eye and the center of curvature of the objective lens. The objective lens and the eye lens merely form an opto-mechanical axis of the apparatus. Hence, the eye need hardly be centered at all.

A further comparison of the optical differences between the Loupe, the Galilean telescope, and the magnifier of the invention is illustrated in FIGS. 6A, 6B, and 6C. As shown in 6A which corresponds to a Loupe, a near object is magnified by an objective L1L such that a slightly divergent beam 61 is directed into the eye. For the Galilean telescope shown in FIG. 6B, objective lens L2G alone has a focal point 65 in front of the observers eye, and an afocal beam 63 is directed into the eye from the combination of the objective L1G and eye lens L2G. For a magnifier according to the invention, objective L1I alone has a focal point 69 behind the observers eye and the combination of the objective and eye lens L2I directs a slightly convergent beam 67 into the eye. Furthermore, the eye lens L2I has a focal point in front of the objective, i.e. a virtual image is provided in front of the objective and inside focus of the objective.

Shown in FIG. 7 is a first folded embodiment of the invention as might be used in a vehicle such as an automobile to look toward the rear while driving. In this embodiment, the lenses are as described before for the unfolded case: lens L1I is the objective lens, and lens L2I is the eye lens. This embodiment also includes, however, a mirror M1, a mirror M2, a case C1 in which to mount the lenses and mirrors, and a mounting system 71. In the preferred mode, the lenses are arranged so as to be parallel to each other and are typically oriented by the case and mounting system such that the optic axis is substantially parallel to the long axis of the vehicle. The mirrors are arranged parallel to each other and are oriented relative to the lenses such that a ray entering the instrument on the optic axis through lens L1I will leave the apparatus through lens L2I on the optic axis on a path parallel to its entrance path. The purpose of the mounting system is not only to hold the instrument with its optic axis substantially parallel to the long axis of the vehicle, but also to hold it in a stable relationship relative to the rear-view mirror of the vehicle once the driver has adjusted the apparatus to suit his needs. In practice, mounting system 71 has seen wide variation, e.g. from a simple post and screw assembly for attaching the instrument to the roof of the vehicle, to a goose-neck with a clamp for attachment to the rear-view mirror post itself, to a clamp and joint assembly for attaching directly to the rear-view mirror. Other types of mounts could, of course, also be used, such as attaching to the windshield or the dashboard.

The center-to-center distance between lens L1I and mirror M1 is represented by d1, the center-to-center distance between mirrors M1 and M1 is represented by d2, and the center-to center distance between mirror M2 and lens L2I is represented by d3. In FIG. 7, E1 represents the driver's eye. R1 and R2 represent rays from an object behind the driver and R3 represents a ray from ahead. M3 is a typical rear-view mirror in a automobile. As illustrated, ray R1 is first refracted by lens L1I. Then it traverses distance d1 and is reflected by mirror M1. It then traverses distance d2, is reflected by mirror M2, then traverses distance d3, and is refracted be lens L2I. It then traverses a distance d4 from lens L2I to rear view mirror M3, and then traverses a distance d5 between the rear-view mirror M3 and the driver's eye. The following table provides the details of the various distances and elements:

TABLE 1

| element | power | diameter/dimension |
| --- | --- | --- |
| L1I | 0.75D | 70 mm |
| L2I | −0.75D | 40 mm |
| M1 | 0 | 75 mm |
| M2 | 0 | 50 mm |
| d1 | | 4.0 in. |
| d2 | | 4.0 in. |
| d3 | | 2.0 in. |
| d4 | | 2.0 in. |

Shown in FIG. 8 is a slight modification of the first folded embodiment described above. This figure, which is substantially to scale, shows in more detail the relationship between the various elements and the effect of the elements on a light bundle entering the instrument. A case 89 holds an objective lens L1I2, a front silvered mirror M1I2 oriented at an angle B relative to the optic axis, a front silvered mirror M2I2 oriented at an angle C relative to the optic axis, and an eye lens L2I2. The light bundle is illustrated by the dotted lines inside the case 89. The separations of the various elements along the optic axis are designated by d1', d2', and d3'. The case has a flange 86 whereby it is attached by a pin 87 and ball joint system (not shown) to a clamp 81. Clamp 81 is used to clamp the apparatus onto rear view mirror M3 by two screws 83 and 85. It is useful to note that, in general, the case needs to be oriented such that the optic axis is substantially horizontal. In most cases, this means that the pin 87 should not be constrained to be only vertical, since often the normal to the rear view mirror has a downward component so that light is directed into the driver's eyes. The following table gives the various specifications of the elements described above:

TABLE 2

| element | power | diameter/dimension |
| --- | --- | --- |
| L1I2 | 0.75D | 2.5 in. |
| L2I2 | −0.75D | 1.25 in. |
| M1I2 | 0 | 2.0 in. |
| M2I2 | 0 | 1.5 in. |
| d1' | | 5.5 in. |
| d2' | | 5.5 in. |
| d3' | | 2.0 in. |
| A | | 90 degrees |
| B | | 67 degrees |
| C | | 67 degrees |
| D | | 90 degrees |

Although angle D is chosen to be 90 degrees in this example, in practice angle D may be altered as much as ±15 degrees or more to thwart unwanted reflections of stray light from entering the eye. In general, this has been found to enhance image contrast with only minor distortion.

Shown in FIG. 9 is a perspective view of the embodiment of FIG. 8 having lenses that are squared off for appearance purposes. A case 99 holding the lenses is held in alignment with the rear-view mirror M3 by means of a clamp 91. Illustrated in the rear-view mirror is a magnified image of a car 95.

FIG. 10 shows a perspective view of the embodiment of FIG. 9 as it looks in an automobile 101.

FIG. 11 shows a top view of another embodiment of the invention which has only one fold and uses the rear view mirror itself for that fold. In this embodiment, an objective lens L1I3 directs light from the rear onto rear view mirror M3, which is then directed toward an eye lens L2I3. The separation between the objective lens and the eye lens is d1''', and is chosen as 22 inches along the optic axis as in the first embodiment. Lenses L1I3 and L2I3 are again of equal and opposite focal lengths, L1I3 being 0.875 Diopters and L2I3 being −0.875 Diopters. A typical size for lens L1I3 is again 70 mm diameter and the rear lens L2I3 is 30 mm in diameter.

FIG. 12 shows yet another embodiment of the invention which uses a magnifying mirror M12 instead of an objective lens as in the previous embodiments. In this embodiment, mirror M12 is shown located at approximately the same distance from the eye as rear-view mirror M3, and the separation d1''' of the mirror M12 from the eye lens L2I4 is again about 22 inches. Similar to the first embodiment, the power of the mirror and the eye lens are equal and opposite, the mirror being 0.75 Diopters and the eye lens being −0.75 Diopters.

The following table provides a comparison of the some of the various embodiments in terms of focal length, magnification and percentage change in focal length relative to the eye alone (i.e. eye accomodation):

TABLE 3

| example | focal length | magnification | % change |
|---------|--------------|---------------|----------|
| FIG. 5  | 7.11 m       | 1.8           | 10%      |
| FIG. 7  | 7.11 m       | 1.8           | 10%      |
| FIG. 11 | 1.39 m       | 1.65          | 22%      |
| FIG. 12 | 1.02 m       | 1.67          | 32%      |

Another embodiment, illustrated in FIG. 13A, makes it possible to use the invention with an outside mirror rather than the rear-view mirror on the inside of a vehicle. Such an embodiment is particularly useful when it is impossible to use the rear-view mirror on the inside as for example occurs for many tractor-trailer rigs. In this embodiment, a truck cab 130 has attached thereto a flat outside mirror M4. A concave spherical mirror M6 receives light from mirror. M4 and directs it to a negative eye lens L2I5. Light from the negative eye lens is then directed onto an inside rear-view type mirror M5 and back into the driver's eye. Again, the focal lengths of the mirror and the eye lens are maintained approximately equal in magnitude, but opposite in sign. As an example, a power of 0.75 Diopters for the spherical mirror and −0.75 Diopters for the eye lens is useful when used with a separation between the mirror M6 and the eye lens of 22 inches as before.

A similar embodiment is illustrated in FIG. 13B wherein the optical system is brought inside the cab. Similar to previous embodiments, a positive objective lens L1I6 directs light reflected from outside mirror M4 onto a mirror M131 which directs the light toward a negative eye lens L2I6. The negative eye lens then directs the light toward mirror M5 and into the observer's eye.

FIG. 14 depicts a hand-carried magnifier for viewing toward the rear. This imbodiment utilizes the same optics as the embodiment described with respect to FIG. 8. In this embodiment, however, a case 130 has been altered to also hold its own rear-viewing mirror 141 and to incorporate a handle 143. In this embodiment, the viewer can change the magnification by simply holding the magnifier at different distances from the eye.

As illustrated in FIG. 15A, a much more compact optical assembly 195 can be obtained by shortening the focal lengths of the positive and negative lens elements, in this case objective element L1I7 and negative eye lens element L2I7. The positive and negative elements are still of equal but opposite powers (or nearly so, as before), but have much stronger optical powers, and are held in position by a housing 197. This results in a compact assembly less than 3 inches long that does not need to be folded for use in the rear view application with automotive mirrors, and can be mounted relative to the rear view mirror in substantially the same manner as the previous embodiments. FIG. 15B shows a typical mounting system 196 for the rear view mirror configuration. In this figure, lens L1I7' is the same as circular lens L1I7 except that it has a square shape (is truncated) in order to cut down on the weight and to provide a pleasing appearance.

In the course of strengthening the optical powers of the elements, it has been found that the optical aberrations are greatly increased. In particular, false color aberration and image distortion are increased. Most of the chromatic aberration is due to the positive element L1I7 and consequently this element was achromatized by forming it of an achromatic doublet in the usual manner well known in the art. In addition, the distortion and all aberrations were minimized by employing computer aided design using the CODE V lens design optimization routine, available from Optical Research Associates of Pasadena, Calif. The general approach was that the aberrations of the positive doublet were balanced (nulled) by opposite contribution imparted by the negative eye lens element. The optical prescription for the optimized assembly is as follows:

TABLE 4

| LENS | RADIUS | THICK. | CLEAR DIAM. | GLASS |
|------|--------|--------|-------------|-------|
| L2I7 | 4.350" CC | 0.12" | 1.60" | SCHOTT BK7 |
|      | 6.500" CC |       | 1.60" |            |
| L1I7(2) | PLANE | 0.16" | 2.50" | SCHOTT F2 |
|      | 9.985" CC |       | 2.50" |            |
| L1I7(1) | 9.985" CX | 0.39" | 2.50" | SCHOTT BK7 |
|      | 3.684" CX |       | 2.50" |            |

The abbreviation "CC" means concave, and "CX" means convex. Lenses L1I7(1) and L1I7(2) form a cemented doublet, and the separation d between lens L1I7 and lens L2I7 is 2.19" (nominal). Schott glass BK7 is code #517642 and Schott glass F2 is code number 620364.

With this prescription, assuming the eye is located 22" to the left of the negative singlet lens and an overall length of the lens assembly of 72.639 mm (2.86 inches), the system has a 4 degree unvignetted field-of-view, very little distortion (−0.515% at 1.55 degrees from the center of the field), and is color corrected. The actual focal lengths of the positive objective lens and the negative eye lens elements are +124.913 mm and −127.872 mm, respectively. As in the previous embodiments, the optical powers of the positive (doublet) element and negative (singlet) element are approximately equal (to within a few percent) and opposite. Consequently, the positive and negative foci do not coincide at all, even though this design has been adjusted to provide afocal magnification. This afocal design provides better seeing with no need for visual accommodation. The apparent visual magnification of this device when combined with the eye, or other short focal length lens (i.e. camera), is very closely 2.0X, albeit the afocal magnification of the system itself is 1.5X. Further, it is a surprising result that in using this achromatic doublet design, the apparent magnification seems to be much less sensitive to the actual location of the eye relative to the negative eye lens than in systems without the achromat. Those skilled in the art will appreciate that there are many variations of the above system that are very useful. For example, it can be used as a low power monocular, rather than for viewing in the rear view mirror. Also, it can be made in much higher powers with appropriate lens optimization. Also, it can be made with very large lenses so that one can view a magnified image easily with both eyes. Some other examples are described below.

Shown in FIG. 16 is another embodiment of the invention which is particularly adapted for use as a rifle or hand-gun scope. Similar to the previous embodiment, the system includes a positive achromatic doublet L1I8 and a negative lens L2I8 with approximately equal powers and a separation that is less than the focal length of either lens, and a housing 191 for holding the various optical elements. As in the previous embodiment, the power of the doublet and the negative eye lens has been increased over the earlier embodiments to achieve a short overall length. However, in this embodiment, a reticle 200 has been added which is projected at infinity in the field of view, by means of a reticle projection system 204. The reticle is illuminated with visible light, say having a wavelength LAMDA in the range of 600 to 650 nanometers. The projection system also includes a positive lens LR that is placed at a distance from the reticle that is slightly longer than the focal length of the lens LR. Illumination from the reticle that is received via the lens LR is reflected into the optical path by means of a reflecting system R1. R1 is made up of a folding mirror M7 and a beam combiner (splitter) S1. The light impinging on folding mirror M7 is reflected onto beam combiner (splitter) S1 which is chosen to selectively reflect the wavelengths used to illuminate the reticle and to transmit all others.

The distance of lens LR from the reticle is chosen to be slightly larger than the focal length of lens LR in order to provide a slightly converging beam exiting lens LR. The additional distance is chosen so that the beam is made parallel (afocal) upon exiting the negative lens of the telescope, i.e. the convergence of the beam exiting lens LR is chosen to be balanced by the amount of divergence that will be imparted by the negative focal length lens L2I8. Hence, the observer will see an image of the reticle in the field of view which appears to be at infinity, thereby making it possible to accurately point the telescope at selected targets.

Those skilled in the art will also understand that a reticle could also be projected in the usual way. The reticle can be placed at one focal length distance from the positive lens, with the whole projection assembly placed to one side of the telescope. Then the two beams can be combined on a beam splitter fed from a folding mirror.

FIG. 17A shows the embodiment of FIG. 16, hereinafter, scope 203, mounted on the end of a rifle 209, by means of a scope mount 211. As with all rifle scopes, the scope and the rifle need to be properly aligned so that they point in the same direction. This can be performed in the usual manner, and in fact is easier with this scope than with other scopes because of the unusually wide field of view and the large eye accommodation. FIG. 17B and FIG. 17C show two other locations for the scope which are possible because of the large eye accommodation and small size. Also, if it is desired to use the rifle sights, rather than a projected reticle image inside the scope, in order to aim the rifle, the embodiment 195 of FIG. 15 can also be mounted on the rifle as illustrated in FIGS. 17A–17C. In some instances, however, the height of the rifle sights will need to be adjusted so that they are visible through the scope.

Shown in FIG. 18 is another embodiment of the invention which uses two magnifiers, such as magnifier 195 and an identical magnifier 196, to make a binocular. Here the two magnifiers are connected by a hinge 215 to accommodate eye position. This binocular is far superior to present binoculars on the market in terms of target acquisition, due to the large eye accommodation and the fact that the target is in focus at all distances.

Shown in FIG. 19 is an embodiment 229 of the invention that uses the same optical elements of magnifier 195, but in a folded configuration. Light from an object traverses an achromatic doublet L1I9 and impinges on a mirror M9. The light is reflected from mirror M9 through a negative lens L2I9 and into the observers eye. As in the previous embodiments, the focal lengths of the two lenses are approximately the same, and the distance between the lenses along the optical path is less than the focal length of either lens. A housing 230 provides the structural support necessary to hold the lenses and the mirror in place, as well as providing a protected environment for the optical elements. This embodiment is particularly well adapted for use on large tractor trailer rigs as an outside magnifying mirror.

As an extension of the embodiment shown in FIG. 19, shown in FIG. 20 is an adaptation of this folded compact format that is integrated into an outside truck mirror 235. The truck mirror includes a housing 237, which holds a full-sized mirrored glass 239, and a compact magnifier according to the invention using the same optical elements as embodiment 229. The compact magnifier has an achromatic doublet L1I10 and a negative lens L2I10 and a folding mirror 242 (not shown). In the preferred mode, the compact magnifier is arranged such that it sits on top of mirrored glass 239, although it could be placed elsewhere as well. Since truck mirror 235 is designed to be used outside, it includes a heating element (not shown) inside the housing 237 to prevent condensation on the mirrors. An adjustment screw 244 is also provided in order to adjust the direction of folding mirror 242 and another adjustment screw 246 is provided to adjust the direction of negative lens L1I10. Splash shields, such as splash shield 248, are provided to protect the exposed optical elements.

Shown in FIG. 21 is hand-held version of the compact magnifier using the same optical elements as embodiment 195. A housing 251 for holding the optical elements also includes a handle 253 for quickly picking up the magnifier and holding it up for viewing.

Those skilled in the art will appreciate that there are many equivalent variations of the above invention as well as many uses that have not been described. For example, in the first folded embodiment shown in FIG. 7, a rear-view mirror has been used with the device to look backward as is important to do in a motor vehicle. The folded design is, however, equally as useful for looking in the forward direction with magnification. The folded path makes a convenient size for the apparatus. Further, those skilled in the art will understand that for vehicular use it may be desirable to attach a rear-view mirror directly to the magnifier case as in the embodiment in FIG. 14 rather than use the rear-view mirror already in the vehicle. Another feature of the invention that has been used in all of the examples is that the focal lengths of the objective element and the eye lens have always been equal in magnitude and opposite in sign. In fact, small variations in the magnitude of the focal length of one element relative to the other (say 10 to 20%) do not appear to seriously erode the visual quality of the images produced. Eye accommodation can be affected slightly, however. Those skilled in the art will appreciate that there are many other uses and configurations of the apparatus that fall within the purview invention. For example, a higher power system would be useful and could compete very successfully with presently available continuous focus binoculars. Also, the particular lens materials can be varied to change the weight and correction.

Shown in FIG. 22 is yet another embodiment of the compact magnifier which is essentially an extended field monocular, or telescope. In this embodiment, objective lens L1I11, which is made up of achromat lenses L1I11(1) and L1I11(2), is accompanied not only by an eye lens L2I11, but also by a field lens FL1. The essential function of the field lens is to catch large angle rays from the objective that would otherwise not be directed through the eye lens. Hence the field lens can be used to dramatically increase the field of the monocular. The table below provides a prescription for this system:

TABLE 5

| LENS | RADIUS OF CURVATURE FRONT | BACK | THICKNESS | APERTURE FRONT | DIAM. BACK | GLASS |
| --- | --- | --- | --- | --- | --- | --- |
| L2I11 | −1.185 CC | 3.400 CC | 0.300 0.050 | 1.100 | 1.100 | ACRYLIC |
| FL1 | 16.865 CX | −3.200 CX | 0.600 0.990 | 1.400 | 1.400 | BK7SCHOTT |
| L1I11(2) | −13.616 CC | 6.500 CC | 0.250 0.050 | 2.500 | 3.000 | STYRENE |
| L1I11(1) | 6.500 CX | −2.449 CX | 0.800 0.100 | 3.000 | 3.000 | BK7SCHOTT |

In this table, the sign convention used is that a positive radius indicates that the center of curvature is toward the top of the figure and a negative radius is to the bottom of the figure. The dimensions are given in inches. The thickness is the axial distance from one lens surface to the next lens surface, starting with the eye lens. The abreviation "CC" means concave, and "CX" means convex.

An important aspect of this embodiment is the very wide field of view, in excess of 20 degrees. Normally, virtual image telescopes have an extremely narrow field of view, typically less than 4 degrees. (For the purposes of this discussion a wide field virtual image telescope would be one with a field of view greater than 5 degrees. Real image telescopes that are wide field often exceed 5 degrees but seldom have a field of view over 12 degrees.) Also, it should be noted that the diameter of both the positive objective lens and the negative objective lens is 3.0 inches in this embodiment. This a very large objective for a monocular, and is important because in this design the size of the objective is directly related to the size of the field. This is quite unlike real image telescopes, where the size of the objective merely controls the amount of light entering the system and the resolution, not the field of view. In real image telescopes, the field of view is a function only of the focal length of the negative eye lens.

Those skilled in the art will understand that this extended field monocular embodiment falls within the broad concept of the invention when one considers the eye lens L2I11 and the field lens FL1 combination together as the effective "eye lens". Then, as in the other embodiments, the magnifier is made up of a positive objective lens having a front focal point located upstream from the positive objective lens; and a negative "eye lens" located downstream from the positive objective lens, with the negative "eye lens" having a first focal point that is upstream of the positive objective lens, said first focal point being located between the front focal point and the positive objective lens.

As in the previous embodiments, another way to describe this monocular is as having a positive objective lens with a front focal point located upstream from the positive objective lens; a negative "eye lens" downstream from the positive objective lens, with the negative "eye lens" having a first focal point located at a point on the opto-mechanical axis that is in a range defined by the front focal point and the back most surface of the objective lens.

As indicated earlier, the positive objective lens measures 3.0" in diameter. This is larger than the normal interocular separation distance of human beings, which is closely 2.5". (Typically this distance does not vary by more than about 0.25" and it is a very rare exception when it varies by as much as 0.5" i.e. the interocular distance nearly always lies in the range between 2.0" up to a maximum of about 3.0". Hereinafter, "about the same as the interocular separation" will mean a separation of 2.5"± delta, where delta <0.5".) Hence to make a binocular for the general public with a pair of such 3" lenses presents some difficulty for the average person. The 3" lenses described could not be used in a straight through, side-by-side, binocular configuration directly without the use of mirrors or prisms for folding the left and right light paths outward to allow room for the full diameters of the left and right objective pairs of positive and negative lenses. Given the short light path between the lenses involved in this monocular, the use of such prisms or mirrors for folding the light path can be quite difficult and would add a lot of weight and size to the eventual binocular.

FIG. 23 shows a top view of a binocular that provides a solution to this interocular distance problem that preserves the wide field concept. A more accurate description of the apparatus would be a binocular with extended monocular field. In this embodiment it has been found that the full field of view of 20 degrees can be obtained using two sets of monocular lenses having the prescriptions set forth in Table 5. However, to obtain the proper interocular distance, lunes are cut off each of the objective elements, having their sagittal distance between the circular arc and the chord to the arc equal to 0.25 inches, thus creating a flat 305 between the two sets of objective lenses. Thus lenses L1I12(1)(L) and L1I12(2)(L) on the left side of the binocular have the same prescription as lenses L1I11(1) and L1I11(2), of Table 5, respectively; and similarly lenses L1I12(1)(R) and L1I12(2) (R) on the right side of the binocular also have the same prescription as lenses L1I11(1) and L1I11(2), of Table 5, respectively. However, for example, lens L1I12(1)(L) has a shape as viewed from the front of the binocular as shown in FIG. 24, where d4=2.375" and d5=2.750", and similarly, lens l1I12(1)(R) has the same shape but has been oriented so that the flat 305 is located on the other side. The top and bottom of the objective lenses have also been truncated symmetrically to cut down on the weight and to present a pleasing appearance. However, such truncations are clearly not required from a functional point of view unless a larger vertical field is also desired. When the two flats on the left and right objective lens elements are placed adjacent each other, the optical center lines of the left side and the right side of the binocular are then a distance apart given by 3/2"+3/2"−0.25"−0.25"=2.5", which is precisely the proper interocular separation.

FIG. 25 shows a front view of the binocular and illustrates its unique appearance. FIG. 26 shows a cross-section of the binocular through the plane 315 looking toward the center of the binoculars where the two flats are located. FIG. 27 shows a view of the binoculars as seen by a user.

The case of the binoculars is typically constructed of plastic and is made up of three major parts, a front part 304, a middle section 301, and an eye portion 303. Of course other materials such as metal could be used, but would likely be more expensive. The case acts to hold the lenses in place relative to one another and is itself held together by screws 312 and 314. Other means of fastening could also be used of course, e.g. the system could be glued together. For aesthetics as much as anything, eye cups 307 and 308 are attached to the eye lenses L2I12(L) and L2I12(R). Such eye cups are typical in the binocular art and are usually constructed of a soft rubber or vinyl. They typically serve to position the eye a particular distance from the eye lens to afford proper viewing. In this embodiment, however, as discussed for earlier embodiments, the eye relief is infinite. Placement of the eyes at the eye cups merely obtains the maximum field of view without getting oil from the eyelid on the eye lens.

Viewing objects through this binocular with extended monocular field is literally stunning, and not just because it has a 20 degree field of view when viewing with both eyes. It provides remarkable stereo vision, and hence depth perception. The reason for this is that the left eye (for example) sees a field of view which is shifted a few degrees to the left of the field seen by the right eye. Conversely, the right eye sees a field shifted a few degrees to the right of that seen by the left eye. The human eye-brain combination then fuses these left and right views with no confusion to provide for this remarkable stereo vision (due to the infinite depth of field inherent in the apparatus). Each eye has a view with extended monocular vision on its side of the field which is seen by that eye only, i.e. there is a center portion where the fields overlap and then there is a non-overlap portion on each side. This is exactly the case for normal unaided human vision or for human vision with eye glasses as well. There, the left eye sees a field which is extended further to the left than does the right eye, and conversely. Binoculars of traditional design do not have this feature. Typically binoculars have left and right optical channels which observe very nearly exactly the same field of view, with no significant left or right monocular extension of the field. (The field of view for each eye is different from the other only by the magnitude of the separation of the objective lenses.)

This embodiment of FIGS. 23–27 so closely mimics the human visual experience, only with increased magnification, that the observer is not noticeably aware of any restriction in the field of view imposed by the device itself. Consequently, events on the athletic field, for example, may be observed and the action followed exactly as with the unaided human eye, but with the advantage of increased magnification. A further advantage is that the large objective lenses provide many times the light gathering capacity of the human eye alone. Hence, the field of view is noticeably brighter than without this binocular instrument, and provides for many low light applications in the evening hours or under lights.

Those skilled in the art will understand that the precise prescription for the lenses used in the wide field monocular of FIG. 22 and the binocular with extended monocular field of FIGS. 23–27 are meant to be exemplary and a wide variation according to the principles of the invention can be used. For example even larger objectives might be useful, and the various lens surfaces could be optimized for specific applications. Further, those skilled in the art will realize that the field of view of any virtual image binocular can be extended where the objective lens diameter is larger than the ocular separation by using the same technique of cutting lunes from the objective lens to reduce the separation of the optic axes of the objective lenses.

I claim:

1. A binocular comprising:
    a first telescope having a first optic axis, said first telescope comprising a first objective lens and a first eye lens, said first objective lens and said first eye lens optically aligned along said first optic axis, wherein said first objective lens does not form a real image upstream of said first eye lens, wherein said first telescope has a first field of view through said first objective lens and said first eye lens in excess of 5 degrees wherein said first telescope has a resolution which is greater than that of the normal human eye;
    a second telescope having a second optic axis, said second telescope comprising a second objective lens and a second eye lens, said second objective lens and said second eye lens optically aligned along said second optic axis, wherein said second objective lens does not form a real image upstream of said second eye lens, wherein said second telescope has a second field of view through said second objective lens and said second eye lens in excess of 5 degrees wherein said second telescope has a resolution which is greater than that of the normal human eye; and
    a holder for holding said first telescope and said second telescope with their optic axes separated and parallel to each other.

2. A binocular as in claim 1 wherein said first objective lens has a flat edge defining a first plane that is orthogonal to an optic axis plane defined by said first and second optic axes and wherein said second objective lens has a flat edge defining a second plane that is parallel to said first plane, and wherein said first objective lens and said second objective lens are held by said holder such that said first and second planes are substantially adjacent to each other.

3. A binocular as in claim 2 herein said holder holds said first and second telescopes so that the separation between their optic axes is about 2.5 inches.

4. A binocular as in claim 3 wherein said first objective lens has a diameter in said optic axis plane in excess of 2.5 inches and wherein said second objective lens has a diameter in said optic axis plane in excess of 2.5' inches.

5. A binocular as in claim 1 wherein said first field of view and said second field of view overlap in a middle portion intersecting a plane defined by said first optic axis and said second optic axis, hereinafter the optic axis plane, and wherein said first field of view has a first non-overlap portion intersecting said optic axis plane and wherein said second field of view has a second non-overlap portion intersecting said optic axis plane, wherein the intersection of said first non-overlap portion with said optic axis plane is greater in linear extent than the separation between said first optic axis and said second optic axis, and the intersection of said second non-overlap portion is greater in linear extent than the separation between said first optic axis and said second optic axis.

6. A binocular as in claim 1 wherein:
    in said first telescope:
        said first objective lens of said first telescope comprises a first positive lens having a first front focal point located upstream from said first objective lens; and said first eye lens comprises a first negative lens and a first field lens located along the first optic axis downstream from said first objective lens, said first eye lens having a first focal point that is upstream of the first objective lens, said first focal point being located between said first front focal point and said first objective lens;

and wherein:

in said second telescope:

said second objective lens of said second telescope comprises a second positive lens having a second front focal point located upstream from said second objective lens; and said second eye lens comprises a second negative lens and a second field lens located along the second optic axis downstream from said second objective lens, said second eye lens having a second focal point that is upstream of the second objective lens, said second focal point being located between said second front focal point and said second objective lens.

7. A binocular as in claim 6 wherein said first positive lens comprises a first achromatic doublet, and wherein said second positive lens comprises a second achromatic doublet.

8. A binocular as in claim 7 wherein said first negative lens has a first negative lens focal length and wherein said fist positive lens has a first positive lens focal length;

wherein said first negative lens focal length has substantially the same magnitude as said first positive lens focal length.

9. A binocular as in claim 6 wherein said first negative lens has a first negative lens focal length and wherein said fist positive lens has a first positive lens focal length;

wherein said first negative lens focal length has substantially the same magnitude as said first positive lens focal length.

10. A binocular as in claim 1 wherein:

in said first telescope:

said first objective lens of said first telescope comprises a first positive lens having a first front focal point located upstream from said first objective lens, said first objective lens having a first back most surface; and said first eye lens comprises a first negative lens and a first field lens located along the first optic axis downstream from said first objective lens, said first negative eye lens and first field lens together having a first eye lens focal point located at a point on said first optic axis that is in a range defined by said first front focal point and the first back most surface of said first objective lens;

and wherein:

in said second telescope:

said second objective lens of said second telescope comprises a second positive lens having a second front focal point located upstream from said second objective lens, said second objective lens having a second back most surface; and said second eye lens comprises a second negative lens and a second field lens located along the second optic axis downstream from said second objective lens, said second negative lens and said second field lens together having a second eye lens focal point located at a point on said second optic axis that is in a range defined by said second front focal point and the second back most surface of said second objective lens.

11. A binocular as in claim 10 wherein said first positive lens comprises a first achromatic doublet, and wherein said second positive lens comprises a second achromatic doublet.

12. A binocular as in claim 11 wherein said first negative lens has a first negative lens focal length and wherein said fist positive lens has a first positive lens focal length;

wherein said first negative lens focal length has substantially the same magnitude as said first positive lens focal length.

13. A binocular as in claim 10 wherein said first negative lens has a first negative lens focal length and wherein said fist positive lens has a first positive lens focal length;

wherein said first negative lens focal length has substantially the same magnitude as said first positive lens focal length.

14. A binocular as in claim 5 wherein:

in said first telescope:

said first objective lens of said first telescope comprises a first positive lens having a first front focal point located upstream from said first objective lens; and said first eye lens comprises a first negative lens located along the first optic axis downstream from said first objective lens, said first eye lens having a first focal point that is upstream of the first objective lens, said first focal point being located between said first front focal point and said first objective lens;

and wherein:

in said second telescope:

said second objective lens of said second telescope comprises a second positive lens having a second front focal point located upstream from said second objective lens; and said second eye lens comprises a second negative lens located along the second optic axis downstream from said second objective lens, said second eye lens having a second focal point that is upstream of the second objective lens, said second focal point being located between said second front focal point and said second objective lens.

15. A binocular as in claim 14 wherein said first negative lens further comprises a first field lens located on said first optic axis and wherein said second negative lens further comprises a second field lens located on said second optic axis.

16. A binocular as in claim 15 wherein said first positive lens comprises a first achromatic doublet, and wherein said second positive lens comprises a second achromatic doublet.

17. A binocular as in claim 16 wherein said first negative lens has a first negative lens focal length and wherein said first positive lens has a first positive lens focal length;

wherein said first negative lens focal length has substantially the same magnitude as said first positive lens focal length.

18. A binocular as in claim 14 wherein said first positive lens comprises a first achromatic doublet, and wherein said second positive lens comprises a second achromatic doublet.

19. A binocular as in claim 18 wherein said first negative lens has a first negative lens focal length and wherein said fist positive lens has a first positive lens focal length;

wherein said first negative lens focal length has substantially the same magnitude as said first positive lens focal length.

* * * * *